United States Patent [19]
Carman, II

[11] Patent Number: 5,454,046
[45] Date of Patent: Sep. 26, 1995

[54] UNIVERSAL SYMBOLIC HANDWRITING RECOGNITION SYSTEM

[75] Inventor: Frank C. Carman, II, Provo, Utah

[73] Assignee: Penkey Corporation, Orem, Utah

[21] Appl. No.: 123,609

[22] Filed: Sep. 17, 1993

[51] Int. Cl.$^6$ ............................................... G06K 9/00
[52] U.S. Cl. ........................................ 382/186; 382/187
[58] Field of Search ................................. 382/13, 24, 30, 382/34; 178/18

[56] References Cited

U.S. PATENT DOCUMENTS

| | | | |
|---|---|---|---|
| 4,284,975 | 8/1981 | Odaka | 382/13 |
| 4,561,105 | 12/1988 | Crane et al. | 382/13 |
| 5,020,117 | 5/1991 | Ooi et al. | 382/13 |
| 5,113,452 | 5/1992 | Chatani et al. | 382/13 |
| 5,138,668 | 8/1992 | Abe | 382/13 |
| 5,157,737 | 10/1992 | Sklarew | 382/13 |
| 5,313,527 | 5/1994 | Guberman et al. | 382/13 |

OTHER PUBLICATIONS

Pen Magazine, Mar.–Apr. 1993.
Heads Up Order No. 702964#.
Heads Up Order No. 302567#.
Newton Technology Brochure.
Penstar Sales brochure.
Communication Intelligence Corp. brochure.
Grid Systems Corporation.
GO Corp., Nov., 1992.

*Primary Examiner*—Joseph Mancuso
*Attorney, Agent, or Firm*—Mueller and Smith

[57] ABSTRACT

A universal symbolic handwriting recognition system for converting user entered time ordered stroke sequences into computer readable text is described. The system operates on two levels: (1) a word-level recognizer, which recognizes the entire group of strokes as a unit, and (2) a parser-level recognizer, which breaks the strokes into segments and recognizes groups of stroke segments within a word, thus recognizing separate characters or character sequences within a word to build a complete recognition string. In both recognition levels, the system trains on actual user samples, either on an entire word, or on a character or character sequence within a word. It does so by building a user specific sample recognition data-base file of text/pattern pairs, where the text is specified by the user in a word confirmation process and the pattern, composed of an index and a feature vector, is created from the actual user input strokes. Thus, as the user continues to use the recognition system and augments his/her user specific sample recognition data-base file, the correct recognition rate climbs approaching 100 percent in normal usage. The word-level recognizer can also be used to train on abbreviations, custom shorthands, and pictographic characters, such as the Japanese Kanji, or Chinese. An abbreviated Japanese Kanji or Chinese handwritten entry can even be trained for recognition. The text in the user specific sample data-base file is maintained in the Unicode format, and the user can specify the recognized return string format as either Unicode, ANSI, or JIS.

41 Claims, 13 Drawing Sheets

UNIVERSAL SYMBOLIC HANDWRITING RECOGNITION SYSTEM

TECHNICAL FIELD

The invention relates to apparatus and method for entering handwritten words, abbreviations, or private shorthands directly via a stylus (as opposed to scanning) into a computer and for recognizing and convening the handwritten entry into text in computer fonts for display on computer monitors and portable display tablets, or for storage in computer data-base files.

BACKGROUND OF THE INVENTION

Pen top (pen type of notebook) computers are being used in ever increasing numbers to enable users to enter and save handwritten information into computers and display the entered information on computer monitors. In the field of medicine, for example, doctors and nurses may use a pen top computer when consulting with patients in order to enter handwritten patient information into the computer. Since pen top computers and portable display tablets weigh a fraction of other types of computers, they can be used in a wide variety of applications by users who may not have access to a regular type of keyboard or who do not feel comfortable in using a keyboard. Policemen may use these types of devices at an accident scene to enter information into a computer by directly writing accident data on the digitizing surface of the tablet. This writing can then be displayed on the tablet screen and saved into a computer data-base or file. In yet another application, salespersons may use pen top computers when calling on customers so that ordering information may be written by hand on the device and displayed to the ordering customer for confirmation, including his/her signature. This information is saved to a database for subsequent display or printing. In the legal field, pen top computers are used for courtroom notetaking or editing existing documents. Often personal shorthands are used in these contexts.

Pen top computers enable users to directly write alphanumeric and pictographic (e.g. Kanji) characters onto the computer's digitizing surface. The handwritten characters are entered into the devices and displayed on the device monitor. Typically, such systems have a tablet type surface in combination with a stylus. The stylus generally has a configuration similar to pens and pencils so as to provide a natural feel and balance to the same user. A user, employing the stylus, applies the tip of the stylus to the tablet's digitizing surface and writes alphanumeric or pictographic characters on this surface much in the same manner as using an ink pen to write on a tablet. Typically, the stylus strokes on the tablet are captured and digitized by the device processor which then reproduces the strokes on the tablet as sample dots interconnected by straight lines. The appearance and feel is the same as if the user were writing on a sheet of paper with an ink pen.

A problem arises in that the handwritten data is not in a form compatible with current computer data-base information storage structures and is not recognizable by the computer as textual data. The computer not only cannot recognize legible handwritten information as textual data, but it cannot recognize illegible handwritten information, abbreviations, and personal shorthand codes as textual data. Moreover, the handwritten data may be entered in a language, such as English, German, Russian, or Japanese, complicating the problem of recognizing the handwritten data as actual text. Handwriting systems have been developed that recognize block printing and some have been developed that recognize connective cursive writing. These systems, however, are "iconic" systems and usually perform poorly. An iconic recognition system is one that looks for particular shapes, such as the shape of an "A" or the shape of a "T", thus requiring the user to write a certain way in order to have the computer system recognize the writing with any degree of reasonable accuracy. With the wide variety of handwriting styles that exist in the general population, such iconic systems have proven to be of questionable value. They are also not applicable beyond their narrow domain of a single language, e.g. English handwriting recognition, and are totally unusable for recognizing abbreviations or custom user shorthands. A recognition process, whereby the handwritten text (be it printed, cursive, mixed printed and cursive, abbreviations, or personal shorthand codes in any language) is convened into computer readable textual data, and one that dynamically learns the user's own handwriting, is needed in order to store the handwritten entered data in computer data-bases in a format that is readable and reproducible by the computer.

SUMMARY

The foregoing problems are solved by a universal symbolic handwriting recognition system and a method of operating the handwriting recognition system that is equipped with a digitizing/display surface and tethered or untethered stylus connected to a computer. This "symbolic" handwriting recognition system does not look for specific shapes as do iconic systems. Rather, as a dynamic learning system, it is continually learning the handwriting style of the user and improving its recognition accuracy with use. It may be used with any language, e.g. English, German, Russian, Japanese, and may be used to recognize abbreviations and custom user shorthands, e.g. Japanese Kanji shorthand. It does this by symbolically associating the user's own handwriting with the text that it represents, thus, dynamically building and updating with use a user specific data-base of handwriting sample/text pairs. The apparatus has a user specific recognition database for storing data pairs. Each pair consists of (1) a feature set and indexing code extracted from the time ordered stroke sequences comprising a user's handwritten word, abbreviation, or personal shorthand code, and (2) the computer readable text (one or more words stored in the Unicode format) that the handwritten strokes represent. This user specific recognition data-base is augmented as the user enters new or unrecognized handwritten textual data. The recognition system is, therefore, a dynamic learning system that continues to gather new user handwriting samples for increasing its recognition capabilities. When the computer processor passes time ordered stroke data to the recognizer, the recognizer compares this stroke data with the stroke data in the data pairs of the user specific recognition data-base. The Unicode computer readable text is then extracted from the pair that has the best match with the input strokes and is passed back to the processor. In this manner the word, abbreviation, or personal shorthand written by the user with a stylus on the digitizing/display surface is convened by the recognition system into computer readable text and displayed in computer fonts on the display surface. If the recognition system does not find a time ordered stroke sequence match in the user specific recognition data-base that meets the "clossness" specified as a confidence level (0–100) by the user, then the recognition system queries the user for textual data and then stores a new data pair, consisting of the user supplied textual data in Unicode and the index and feature set extracted for the time ordered stroke sequences that failed the recognition test, in the user specific recognition data-base, thus improving subsequent recognition by virtue of an augmented user specific sample recognition data-base file.

The handwriting recognition system operates over two levels, which may be configured by the user: (1) a word-level recognition, whereby the entire set of user entered time ordered stroke sequences are recognized as a single unit in the manner described above, and (2) a parser-level recognition, whereby the set of user entered time ordered strokes are segmented and examined in segment groups for individual character or character sequence level recognition. The word-level recognition may be used with entire words, abbreviations, custom shorthands, and pictographic characters such as Japanese Kanji or Chinese. The parser-level recognition is used only with alphabetic writing systems, and not with pictographic systems such as is found in Japanese or Chinese. In addition, the parser-level recognition is used to recognize words that have not been trained with text/pattern pairs in the user specific sample recognition data-base. The parser-level recognition recognizes individual characters or character sequences within a word. It does so by searching the user specific sample recognition data-base over stroke segment groups in the same manner as the word-level recognizer searches the user specific sample recognition data-base with entire stroke groups. All pertinent permutations and combinations of stroke segments, derived from the user entered time ordered stroke sequences, are examined in this way by the parser to build the recognized word from recognized characters or character sequences. The handwriting recognition system offers the user an interface that allows him/her to train the recognition data-base on individual characters or character sequences in the context of complete words.

The indexing information of a data pair in the user specific sample recognition data-base consists of (1) the number of strokes in the time ordered stroke sequences, and (2) the number of stroke inflection points (used for stroke segmentation) located within each stroke. This indexing of the subsequent time ordered stroke sequence features allows for rapid binary searching of the user specific sample recognition data-base. A stroke inflection point is found as a significant bend in the stroke, or as a top or bottom location in the stroke, or as a baseline crossing point in the stroke. The features of a data pair in the user specific sample recognition data-base consist of: (1) the relative total time duration taken by the user to write the stroke sequences saved if the user has set a timing switch for signature verification, (2) the relative word bottom location, measured along the vertical from the calculated base line of the word as a function of the user-set inter-line spacing, (3) the relative word height measured as a function of the user-set inter-line spacing, (4) the total word aspect ratio, measured as a function of the word height over the diagonal of the word bounding box, and (5) features for each stroke in the user entered time ordered stroke sequence. These stroke features, recorded in the chronological ordering of each stroke, include: (1) the stroke's average moment, (2) the stroke's aspect ratio, measured as a function of the height of the stroke divided by the length of the stroke, with special exceptions for dot, vertical line, and horizontal line, (3) the stroke's beginning and ending timing marks relative to the total word tinting, saved if the user has set a timing switch for signature verification, (4) the stroke's beginning and ending coordinates relative to the total word with interpolations for dot, vertical line, and horizontal line, (5) features associated with each inflection point in the stroke, (6) the relative time duration from the last located inflection point (or from the stroke's beginning point, if the stroke has no inflection points) to the end of the stroke, (7) the relative stroke end-point x-coordinate from the last located inflection point (or from the stroke's beginning x-coordinate, if the stroke has no inflection points) with interpolations for dot, horizontal line, and vertical line, and (8) the relative x and y curvatures calculated from the stroke's last inflection point (or from the stroke's beginning point, if the stroke has no inflection points) to the stroke's end point. This curvature is a function of the difference between the average of the coordinate points over the specified stroke segment and the midpoint of the stroke segment for the given coordinate. The features associated with each stroke inflection point include: (1) the relative distance traveled along the stroke from the stroke's beginning point to the current stroke inflection point, (2) the relative x-coordinate overlap between the two stroke segments formed from the current inflection point to the previous inflection point (or the stroke starting point, if there is no previous inflection point) and from the current inflection point to the next inflection point (or the stroke ending point, if the stroke has no next inflection point), (3) the inflection point's relative x-coordinate, measured in relation to the previous inflection point's x-coordinate (or stroke's starting point x-coordinate, if the stroke has no previous inflection point), (4) the inflection point's relative x-coordinate, measured in relation to the entire stroke, (5) the inflection point's relative y-coordinate measured in relation to the entire stroke, (6) the x and y curvatures measured from the current stroke's inflection point to the previous stroke's inflection point (or stroke's starting point, if them is no previous inflection point); this curvature is a function of the difference between the average of the coordinate points over the specified stroke segment and the midpoint of the stroke segment for the given coordinate, and (7) the relative inflection point's timing mark measured in relation to the previous inflection point's timing mark (or the stroke's starting point timing mark, if there is no previous inflection point), saved if the user has set a timing switch for signature verification.

To search the user specific sample recognition data-base, the recognition system reads the data-base file into RAM memory and structures it for rapid searching. The structure consists of a linked list of class nodes that are indexed for rapid binary searching. Each class node represents a unique index from the data pairs in the recognition data-base. Associated with each class node is a linked list of unique word nodes, representing the different Unicode character strings from the data pairs in the recognition data-base that have the same index. Associated with each word node is a linked list of pattern nodes, representing the features from the data pairs in the recognition data-base. When a set of user input strokes are used to search the user specific sample recognition data-base, the following actions are performed: (1) the user's strokes are analyzed, extracting an index and set of features. (2) This index is used in a binary search to rapidly find the class node in the RAM structure of the recognition data-base. (3) Each word node of the located class node is then examined to create a decision value for the word. This is done by comparing each pattern node associated with a given word node with the extracted features of the user's strokes. Each such feature produces a decision value for the feature. The lowest such decision value is then set as the decision value for the given pattern node. The highest pattern node decision value is then used to set the word node decision value. (4) The highest word node decision value determines the Unicode string selection for the recognition result. If the decision value of this highest word decision value is not at a user pre-set level or if more than one word decision value is found to be the highest or close to each other, then the recognition system queries the user for the correct recognition, at which time the user may choose to store the correct Unicode character string with the new sample time ordered stroke sequences into the user specific sample recognition data-base to augment its subsequent recognition capabilities. If this choice is made, then the RAM structure of the recognition data-base is updated as well as the recognition data-base file.

Each user entered stroke is represented as a contiguous sequence of set pixels on the display surface (x/y coordinate pairs) ordered chronologically and indexed from the first coordinate pair to the last coordinate pair. This is achieved by extrapolating between sample points given by the digitizing surface. A worm of a specified length (i.e. a certain number of index points) is placed over the stroke at the beginning of the stroke. This worm acts as an index place holder for three points along the stroke: (1) the beginning of the worm, (2) the mid-point of the worm, and (3) the end of the womb. Each of these three points is measured as an index along the stroke. A worm moment is defined as the square of the distance between the x/y coordinates of the stroke associated with the center point of the worm and the x/y coordinates associated with the mid point between the two stroke points associated with the beginning and ending points of the worm. It is in essence a measure of the bending of the stroke along the worm. The sum of the worm moments is calculated as the worm inches (one index point at a time) along the stroke from the beginning of the stroke to the end of the stroke. This sum is then divided by the number of worm moments summed, giving the stroke's average moment, which is one of the stroke features described above. A plot of the worm moments across the stroke forms a locus of a bend parameter. Using a contextually dependent peak-picking procedure, bend stroke inflection points are found from this worm moment plot. Top (e.g. top of upside-down "U") and bottom (e.g. bottom of "U") inflection points are added to the bend inflection points. Also, when a stroke crosses the base line in either direction, base line crossing points are created and added as additional inflection points. A thinning procedure is then used to thin out the total number of inflection points so that they represent stroke segmentation in a more natural manner. The base line of the word is calculated from the following steps: (1) The stroke crossings in a horizontal scan-line traversal from left to right is summed and recorded for each scan line in the word bounding box from top to bottom. (2) Maximum stroke crossing and minimum stroke crossing values are calculated. (3) Beginning with the lowest scan-line and moving up one scan line at a time, the scan-line stroke crossing values are compared with the minimum and maximum values. This process terminates when a scan-line stroke crossing count is greater than or equal to the mid-point between the minimum and maximum values. This scan line is then selected as the base-line for the word.

The parser creates a search tree in looking for stroke segments that can be identified as distinct characters or character strings. Each node of the search tree represents a permutation and combination of stroke segments. These stroke segments are formed from the stroke segmentation process described above, except that each segment considered by the parser must be delimited by either a stroke beginning or ending point, or by a stroke inflection point that is close to the baseline. Thus, a parser stroke segment may consist of one or more contiguous segments as described previously. Each parser search tree node marks one stroke as a main stroke. While at a given node in the search tree, three other nodes may be created and visited, demonstrating the use of a trinary search tree. The first node in the search tree consists of the first segment of the chronologically first stroke of the time ordered stroke sequences. When a node is visited (entered) during the search process, the following steps occur: (1) The stroke segments represented by the node are sent to the recognizer for recognition. If they were recognized, then a returned Unicode string is saved in the node along with its decision value represented as a confidence level (0–100). This saved Unicode string is the one returned by the recognizer with the highest confidence level of all those returned by the recognizer. (2) A son node is then created and visited. This consists of the same stroke segments as the son node's originator node with the addition of the next chronological stroke added to the combination of strokes, but with no segments of this new stroke selected. This new stroke is also set as the main stroke for the node. This son node is not examined for recognition since its stroke segments are the same as those of its originator. If there are no additional strokes to create a son node, then the next step is executed. (3) After returning from visiting a son node, a brother node is created and visited. This consists of the same stroke segments as the node's originator node with the addition of the next contiguous segment of the current node's main stroke. If there are no additional segments in the node's main stroke, then the next step is executed. (4) After returning from visiting a brother node and if the node's stroke segment combinations had been recognized, then a down node is created and visited. This new node's stroke segment combination is formed by removing from further consideration any of the current node's stroke segments and beginning with the first available chronological stroke segment. The down node's father is the originator of the down node. A terminal node is one where there are no more stroke segments available for creating son, brother, or down nodes. A candidate Unicode string return from the parser is created by taking the recognized Unitode string from a terminal node and concatenating to the left its father's recognized Unicode string, continuing in this manner from node to father node until a top node is encountered that has no father node. A partial recognition may be found from the parser when a terminal node that has no recognized Unicode string is used to create a partial recognition by proceeding from node to father node in the same manner as above, but with the partial recognition designated by some terminal character such as a Unicode asterisk. Such partial recognitions of user entered time ordered stroke sequences are good indications of which characters or character sequences that need to be trained to increase the parser's recognition capabilities. The recognition system offers the user the opportunity of making these in-context character or character string trainings of the user specific sample recognition data-base file. The parser operates on three levels in the following order: (1) a short search with the use of one or more dictionaries, (2) a long search with the use of one or more dictionaries, (3) a long search without the use of any dictionaries. In a short search, a son node is not considered for visiting if the considered additional stroke is horizontally separated from the horizontal extents of the current node's stroke segment combinations. Also, brother node searches will not continue beyond a certain number of brother nodes with unrecognized stroke segment combinations. In addition, all recognitions are checked against a dictionary to see if the partial or complete word thus created is found within the dictionary. If the sequence is not found in the dictionary, the node's recognition is disallowed and canceled. In a long search with the use of one or more dictionaries, the two restrictions placed on a short search are removed but the dictionary check is retained. In a long search without the use of any dictionaries, the two restrictions placed on a short search are removed and no dictionary check is made, accepting whatever Unicode string is returned from the recognizer.

Other objects of the invention will, in pan, be obvious and will, in part, appear hereinafter. The invention, accordingly, comprises the system and method possessing the construction, combination of elements, arrangement of pans and steps which are exemplified in the following detailed disclosure.

For a fuller understanding of the nature and objects of the invention, reference should be had to the following Detailed Description taken in connection with the accompanying drawings.

DETAILED DESCRIPTION OF THE INVENTION

Figure 1:
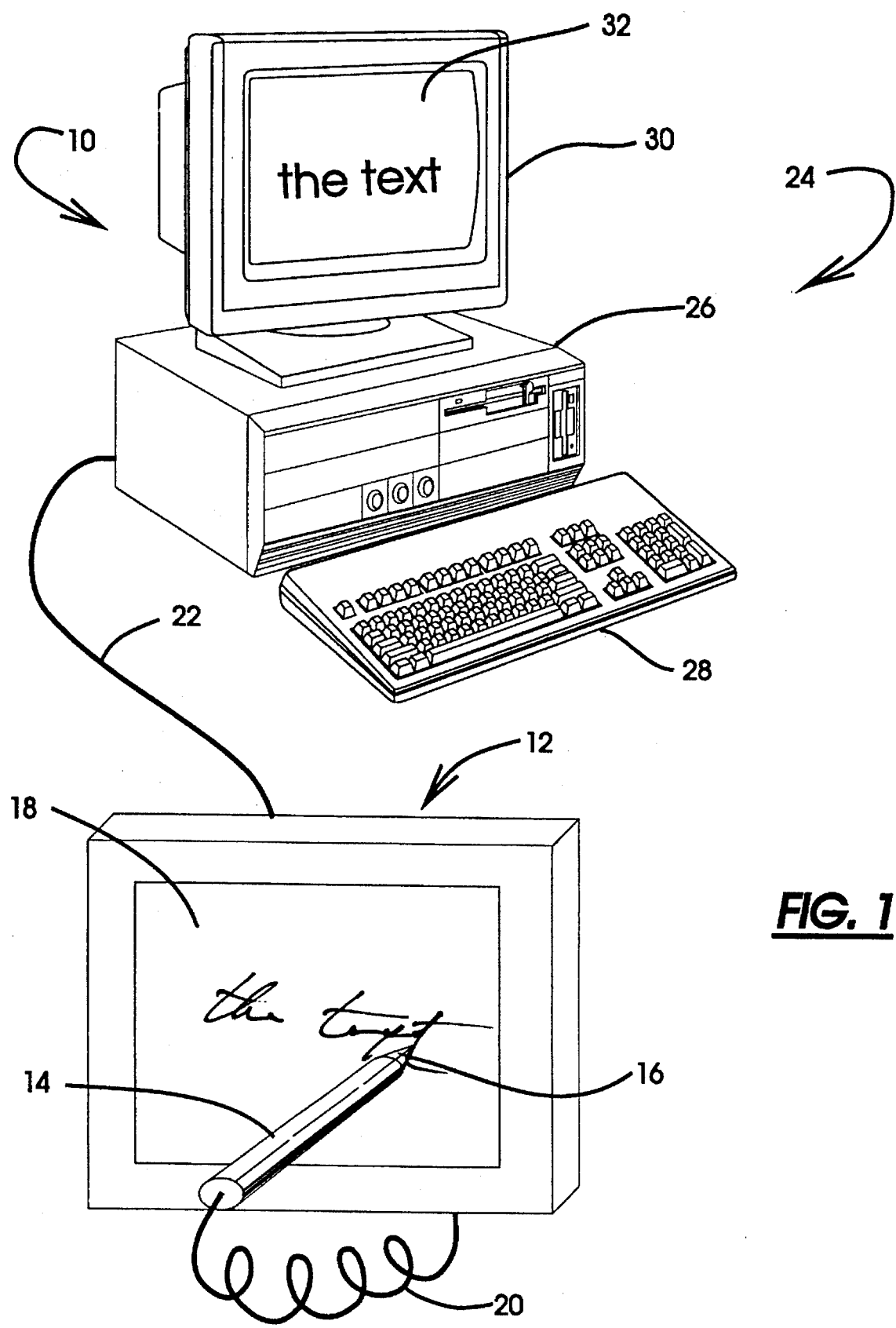
FIG. 1 illustrates pen top computer and personal computer systems embodying the invention.

Referring to FIG. 1, an exemplary arrangement of the present system is pictorially represented as recognition system 10. System 10 is seen to operate with an input device 12 which serves to respond to handwritten information entered by the user who employs a pen-like locator or input device 14, the tip 16 of which is foraged as a stylus. The input device 12 conventionally is referred to as either a "pen top" computer, portable, or personal digital assistant (PDA). These pen top devices typically are configured as a flat display, for example provided as a liquid crystal display (LCD), the active surface of which is combined with a digitizer. Digitizer functions may be provided, for instance, in conjunction with a transparent resistive layer. Such an active, digitizer combining surface is represented at 18. The pen-like device 14 may or may not be electrically attached by a signal conveying cable or conductor 20 with device 12. In this regard, earlier pen top model devices have contained such tethered pen components, however, current models and desired models of pen tops have untethered pens. In general, the user will employ the pen 14 in the same manner as an ink pen, positioning the stylus component 16 in adjacency with surface 18. The surface 18 electronically reponds to the position of stylus 16 to derive instantaneous coordinates of the position of the stylus 16 with respect to surface 18. For convenience, the pen top device 12 will instantaneously publish the location of the stylus 16 using LCD display components at surface 18 such that the user experiences the same effect as writing with a pen on paper. For example, the cursive words "the text" are seen written by the pen device 14 and displayed at surface 18. The coordinate signals as developed by the input device 12 may be employed with any of a variety of devices.

Generally, device 12 will incorporate a processor and memory carrying out a recognizer function wherein the recognized text is published at display surface 18 following formation of a word or symbol in a manner of immediate recognition. Alternatively, the surface may publish recognized text on a delayed basis, for example at the command of the user. Surface 18 also provides confirmation screens for user training procedures according to the invention. A broad variety of hardware implementations of the system are available, for example, the digitizer-display surface based device may operate with a remote processor, although this is unlikely. However, for demonstration purposes, such an association is represented in the figure by cable 22 extending to a computer assemblage represented generally at 24. Assemblage 24 includes a processor 26 which typically performs in conjunction with a keyboard 28 and a monitor 30. A display associated with the assemblage 24 is shown at 32. For the instant example, the cursive user input to the surface 18 of pen top device 12 is seen to have been treated by software according to the invention, to the extent that the cursive handwriting generated at device 12 has been recognized and published, for example, in block letter form at surface 32. In general, the processor used with the system may be, although not limited thereto, a processor of the type commonly known as a "386" or "486".

Digitizing techniques are described, for example, in U.S. Pat. No. 4,853,493 by Schloser, et al., entitled "Electrographic Apparatus", issued Aug. 1, 1989; U.S. Pat. No. 4,650,926 by Nakamura, et al., entitled "Electrographic System and Method", issued Mar. 17, 1987; U.S. Pat. No. 4,600,807 by Kable, entitled "Electrographic Apparatus", issued Jul. 15, 1986; and U.S. Pat. No. 4,678,869 by Kable, entitled "Position Responsive Apparatus, System and Method Having Electrographic Application", issued Jul. 7, 1987, all of which are incorporated herein by reference.

While one arrangement of the use of the recognition system 10 is shown in FIG. 1, in other applications, the portable pen top input device 12 as noted, typically incorporate the processor apparatus features as an integral unit, thereby enabling it to be moved from one location to another. In another application, the display or monitor 30 associated with processor 26 may be equipped with a writing surface similar to the surface 18 of pen top device 12, thereby enabling information to be directly written by a pen-type implement onto and displayed at the monitor 30 display surface 32. In general, for the system shown at 10, the processor 26 will incorporate an application card installed in a slot of its mother board.

Figure 2:
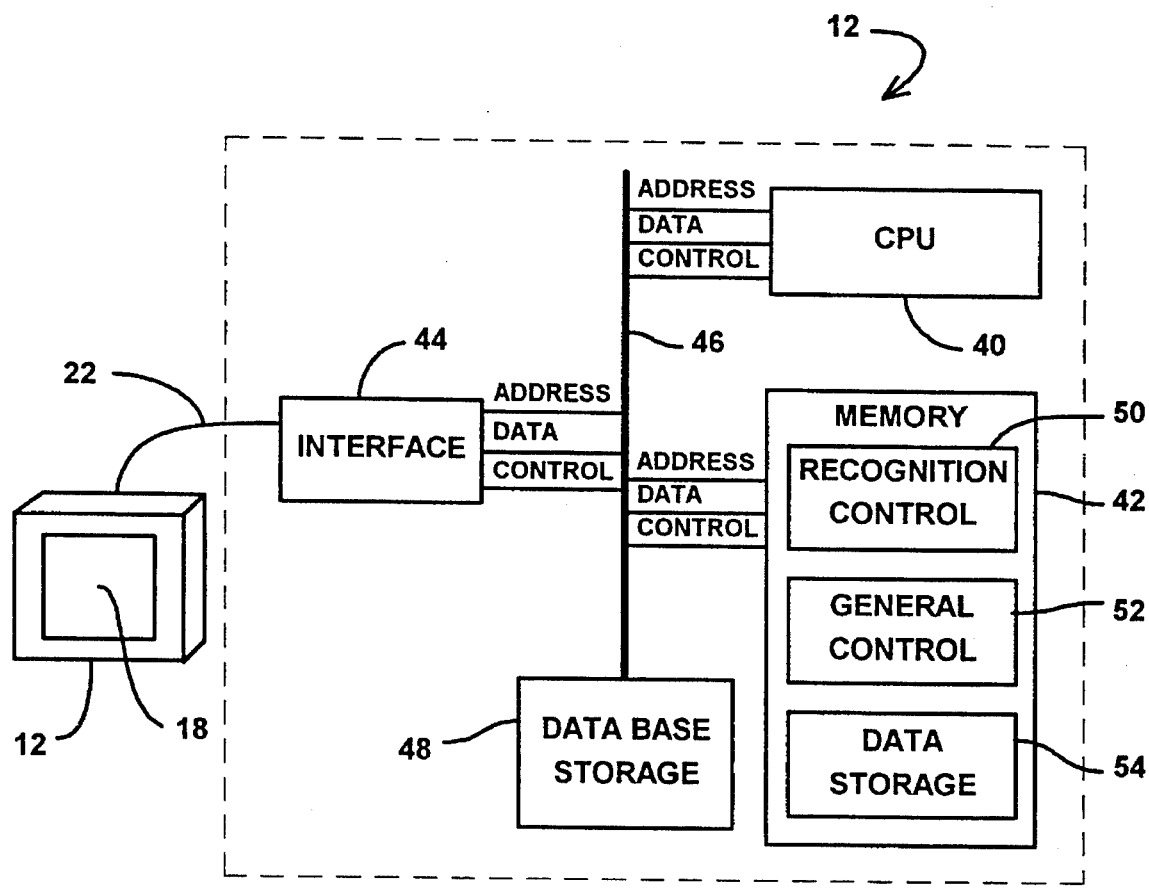
FIG. 2 sets forth details of the processor of the pen top computer illustrated in FIG. 1 in accordance with the principles of the invention.

Referring to FIG. 2, the general structuring of a computer which may be employed with the system is represented in block diagrammatic form. In view of their ubiquitous nature, such processors 12 need not be described in detail for an understanding of the invention and in general have a central processing unit 40, memory unit 42, and interface unit 44, each such unit being connected by address, data, and control leads to a data bus represented at 46. Interface unit 44 serves to couple databus 46 with data input and output devices such as monitors, keyboards, pen top devices, or a writing input device where coordinate information is evolved from that device itself so that information such as words, numerals, symbols and graphical information as so entered to the central processor 40 and memory 42 may be processed and ultimately displayed or printed out in a desired textual format. The association between the central processing unit 40 and memory 42 is by bus 46 which also is interconnecting with storage device 48. The processor 40 may be of a type often times referred to as a personal computer and for the present system 10 may employ the keyboard 28 (FIG. 1) for the purpose of entering supplemental information.

FIG. 2 also reveals that the memory component 42 of the processor 12 includes a recognition control 50 which provides instructions serving to control the recognition system 10 to enable users to recognize entered handwritten data and convert such information into computer recognized codes for displaying computer fonts, for example as at display surface 18. Operation instructions additionally are installed within the memory unit 42 such as operations program 52 which, for example, operates to capture coordinate based, real time vector information as a user is writing at the surface 18 of device 22 and to pass this information to recognition control 50 and retrieve and process the recognized textual results of the program 50. Such captured real time vector information is to be understood to be any form of drawn vector input and can include, but not be limited to, printed, cursive, or printed and cursive, mixed alpha-numeric characters (in any writing system, such as Roman, Cyrillic, Greek, Hebrew, Arabic), abbreviations, custom personal shorthands, and Japanese, Chinese, or Korean pictographic characters. It is not necessary to describe other features of the general control 52 in detail for an understanding of the invention. Additionally incorporated within the memory unit 42, is a conventional data storage feature as represented at block 54.

Figure 3A:
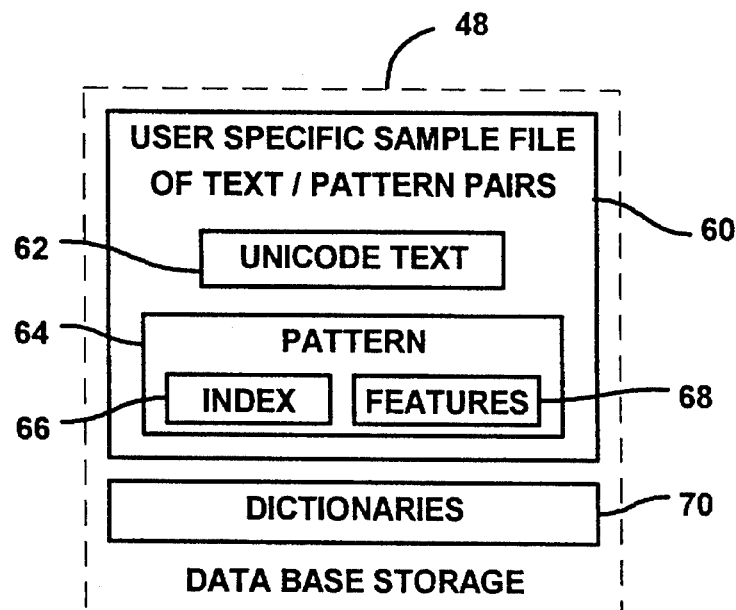
FIGS. 3A and 3B, respectively, set forth illustrative database storage files and memory storage data used with the pen top systems set forth in FIGS. 1 and 2.

Looking momentarily to FIG. 3A, the infrastructures associated with data-base storage function 48 are revealed in block diagrammatic form. The data-base storage function 48 again is represented within a dashed line boundary represented by that same numeration. The infrastructure component represented at block 60 in FIG. 3A is a user specific sample file of text/pattern pairs. These memory retained data-base text/pattern pairs respectively are represented at blocks 62 and 64. Additional data provided are dictionaries as represented at block 70. Pattern data 64 also is seen to incorporate an index function 66 and a feature function 68. The text represented at block 62 may consist of one or more words represented in Unicode, a 16-bit character representation defined by the Unicode Consortium of Mountain View, Calif. This representation is used instead of ASCII or ANSI representations, since Unicode can accommodate over 65,000 character representations, representing the definition of character glyphs of virtually all languages of the world, whereas ASCII and ANSI representations are limited to 256 characters.

Figure 3B:
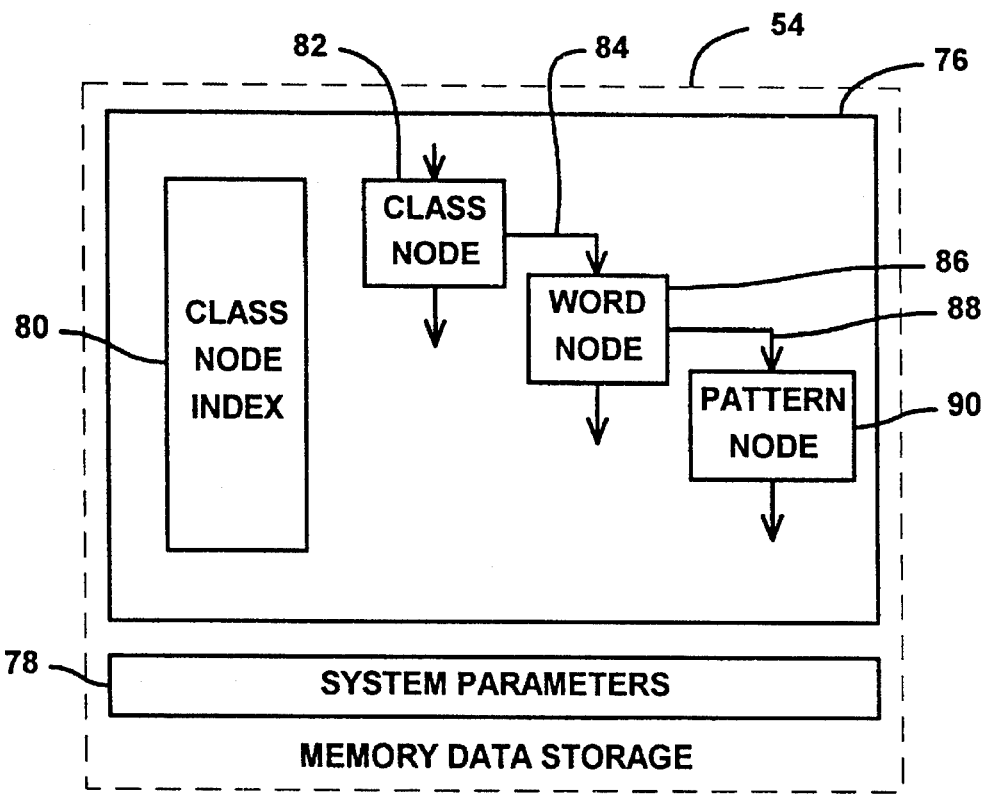

FIG. 3B illustrates the infrastructure associated with data storage component 54 of memory 42. Accordingly, block 54 again is represented at a dashed boundary with the same numeration and is seen to incorporate a class node index represented at block 80, which index is associated with a class node represented at block 82 which is associated as represented at line 84 with a next hierarchical word node feature represented at block 86 which, in turn, is associated as represented at line 88 with a pattern node data component represented at block 90. The figure also shows a block 78 providing system parameters which may be set by the user. Such parameters are detailed hereinafter, but include a timing flag for signature verification, recognition cutoff levels, pairing selecting and the like.

Looking additionally to FIG. 2, the central processing unit of the system, performing under the instructions of general control 52 of memory 42, acquires word samples consisting of time ordered stroke sequences and passes these sequences to a control performing in conjunction with the recognition control features 50 stored in memory 42. Under this control, the acquired samples are analyzed, an index and feature vector being built for the samples. The CPU then performs the following actions: (1) it searches memory data storage 54 for a pattern match with the text/pattern pairs 62, 64 stored as class (index 82) word (Unicode text) 86 pattern (feature vector) 90 nodes in memory 54. If a match is found, the recognition control instructions 50 serve to return the Unitode text to the general control based operation 52, otherwise (2) recognition control 50 based instruction functions to build a data-base user specific text/pattern pair from the analyzed samples and the user's confirmation or entry of the actual Unicode text, and updates (augments) both sample file 60 (FIG. 3A) and memory data storage 54 (FIG. 3B) and then returns this Unicode text to operations under general control 52. The text may consist of one or more words represented in the noted Unicode.

Since each data-base sample file 60 is user specific, the recognition system of the invention is able to recognize writing of different users by selecting an appropriate user sample file. It also is able to improve its recognition capability as a dynamic learning system by adding text/pattern pairs to the sample files 60 and the memory data storage 54 as directed by the user when recognition fails to meet the user's desired confidence level.

Figure 5:
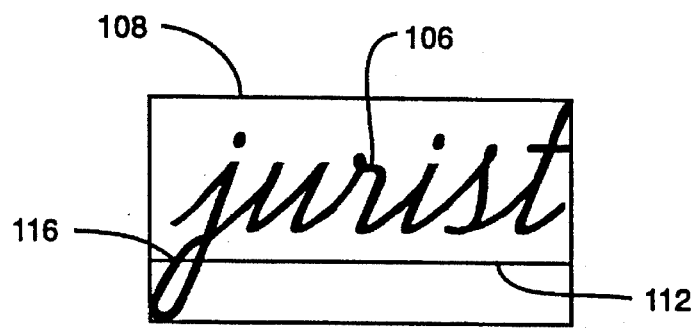
FIG. 5 illustrates a snapshot of a time ordered stroke sequence during the baseline calculation in accordance with the principles of the invention.
Figure 4:
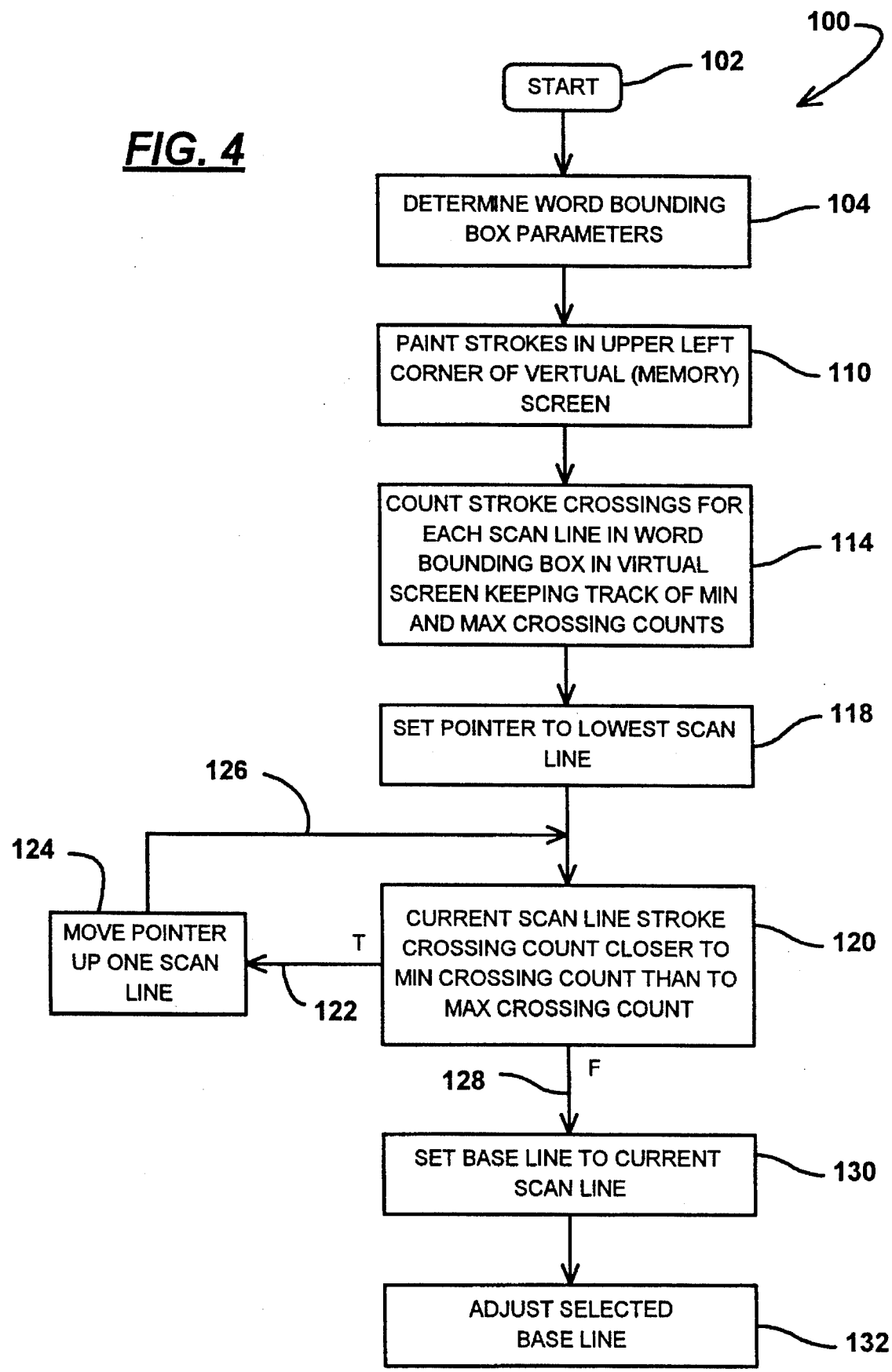
FIG. 4 is a flow chart of the operation of finding the baseline for a group of strokes input to the computer by the user with the stylus in accordance with the principles of the invention.

The handwriting recognition system operates over two levels, which may be configured by the user as a word level recognition or as a parser level recognition. For either of these levels, as an initial aspect of recognition analysis, a baseline is calculated for a given word. A word is defined as consisting of one or more strokes within the system in conjunction with an inter-word spacing parameter which is set by the user. A stroke is provided as that contiguous sequence of coordinate points or pixels outputted in the pen down interval occurring as "pen up-pen down-pen up". Correspondingly, a segment is represented as those coordinate points or pixels extending continuously between inflection or end points of a stroke. Referring to FIG. 4, the word baseline generator under which CPU 40 performs in conjunction with a word is represented in general at 100. The baseline generator 100 calculates a baseline for a given word, and this baseline is used in subsequent feature extraction. The process of baseline calculation is shown commencing at start position 102 leading to the instructions represented at block 104 which provide for a determination of the bounding box parameters of an identified word. In this regard, the process of baseline calculation commences as represented at block 104 in a manner wherein each coordinate point of each stroke in the time ordered stroke sequence that makes up a word is examined to find a bounding box. Looking additionally to FIG. 5, an exemplary stroke is represented at 106 for a graphic representation of the word "jurist". Note that four strokes are present, the longer primary letters j-u-r-i-s-t, a "t" crossing and two dots. The bounding box is graphically represented in FIG. 5 as the rectangle 108 which identifies the upper and lower right and left terminal locations of the entire word. For example, the bounding box parameters for the word are the minimum and maximum values for both the x and y coordinates identified from digitizer performance. These values are used to offset the coordinates for painting of the strokes in the upper left-hand corner of a virtual (memory) screen, a next step represented in FIG. 4 at block 110. FIG. 5 shows a scan line 112 which may be defined as a horizontal line at a certain pixel level of the virtual screen that runs from the left side of the word bounding box 108 to its right side. Traversing this scan line from left to right, it is found to cross the stroke portions seen, for example at 106, within the bounding box. As set forth at block 114 in FIG. 4, each of such crossing points of the scan line 112, for example as shown at 116 in FIG. 5, is counted and the sum of such crossings is associated with the particular scan line being traversed. Each scan line within the word bounding box 108 is traversed in this manner. While the scanning is being carried out, the minimum crossing count and the maximum crossing count parameters are updated, so that when all scan lines have been traversed to calculate their stroke crossing counts, a true minimum scan line crossing count and a maximum scan line crossing count will have been calculated. For the purpose of scanning, as represented in FIG. 4 at block 118, a pointer is set to point to the lowest scan line, i.e. the bottom of the bounding box 108. The crossing count of the scan line pointed to is examined in relation to the minimum and maximum scan line crossing counts. As represented at block 120, in FIG. 4, if the current scan line crossing count is closer to the minimum scan line crossing count than to the maximum scan line crossing count, then as represented at line 122 and block 124, the pointer is moved up one scan line and, as represented at line 126, the test is made again. This procedure continues until the test condition is no longer met, at which time the current scan line is assigned as the word base line as represented at line 128 and block 130 in FIG. 4.

If the selected base line is from a scan line that is less than a pre-specified distance from the top of the bounding box, then the base line is adjusted to the bottom of the bounding box as represented at block 132.

Figure 6:
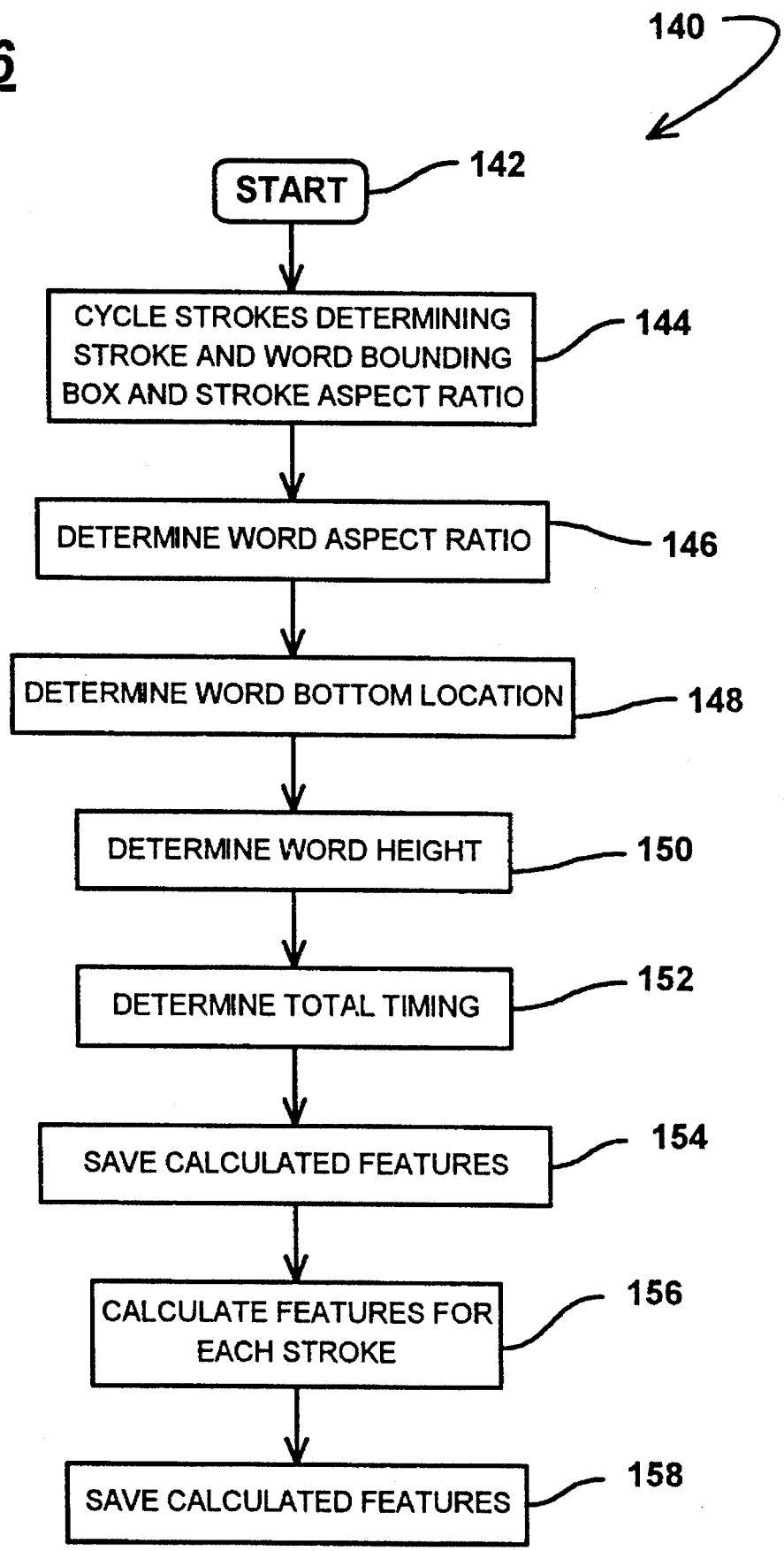
FIG. 6 is a flow chart of the operation of extracting features from a group of time ordered strokes input to the computer by the user.

Each feature in the feature vector of a text/pattern pair in the user specific sample data-base file (FIG. 3A) is represented by a single byte with the feature metric normalized in a predefined range of 0 to 255. Referring to FIG. 6, a flow chart of the operations carried out extracting features from a group of time ordered strokes is presented. Starting at position 142, the word analyzer 140, as represented at block 144 cycles through the time-ordered sequence of strokes and determines each stroke bounding box parameter ($x_{min}$, $x_{max}$, $y_{min}$, and $y_{max}$ coordinate points for each stroke), the entire word bounding box ($x_{min}$, $x_{max}$, $y_{min}$, and $y_{max}$) coordinate points for the entire word, stroke beginning and ending times (if the timing switch was set by the user for signature verification), and each stroke aspect ratio. The latter stroke aspect ratio is determined as follows: if both the stroke width and height are each less than or equal to a predetermined number of pixels, the aspect ratio is set to 128 and the stroke is considered a "dot". Otherwise, if the stroke width is less than or equal to the predetermined number of pixels, then the aspect ratio is set to 255 and the stroke is determined as a "vertical line". Otherwise, if the stroke height is less than or equal to the predetermined number of pixels, then the aspect ratio is set to zero and the stroke is considered a "horizontal line". Otherwise, the aspect ratio of each stroke is determined to be 510.0/3.1459265*ARCTAN(stroke-height/stroke-width). As set forth at block 146, when CPU 40 ascertains that a word consists of only one stroke, then a determination is made that the word aspect ratio is the same as the stroke aspect ratio for a dot, a vertical line, and horizontal line. For the general case of a single stroke word, and for multiple stroke words, central CPU 40 determines that the word aspect ratio is 255*height/diagonal where the height is the word height and the diagonal is the square root of the height squared plus the width squared. Then, as indicated at block 148, the word bottom location is determined. The word bottom location relative to the base line is determined by CPU 40 as 255*(($y_{max}$+line-space)/(2*line-space)) where $y_{max}$ is the visually lowest part of the word, and line-space is the user set spacing assumed between writing lines. Next, as represented at block 150, a determination is made of word height. The word height is determined as 255*(($y_{max}$-$y_{min}$)/(line-space)) and clipped to the range 0–255 as are all other features. $y_{max}$ and $y_{min}$ are the vertical word maximum and minimum y-coordinates respectively.

Looking to block 152, if the user had set the timing switch for signature verification, then the total word timing is calculated as a proportion of 10 seconds adjusted to the range 0–255. Then, as represented at block 154, CPU 40 records the words number of strokes in the index/feature vector and saves the word timing (if the timing switch has been set), bottom location, height, and aspect ratio in a FIFO (first in/first out) stack in memory for later use.

Figure 7:
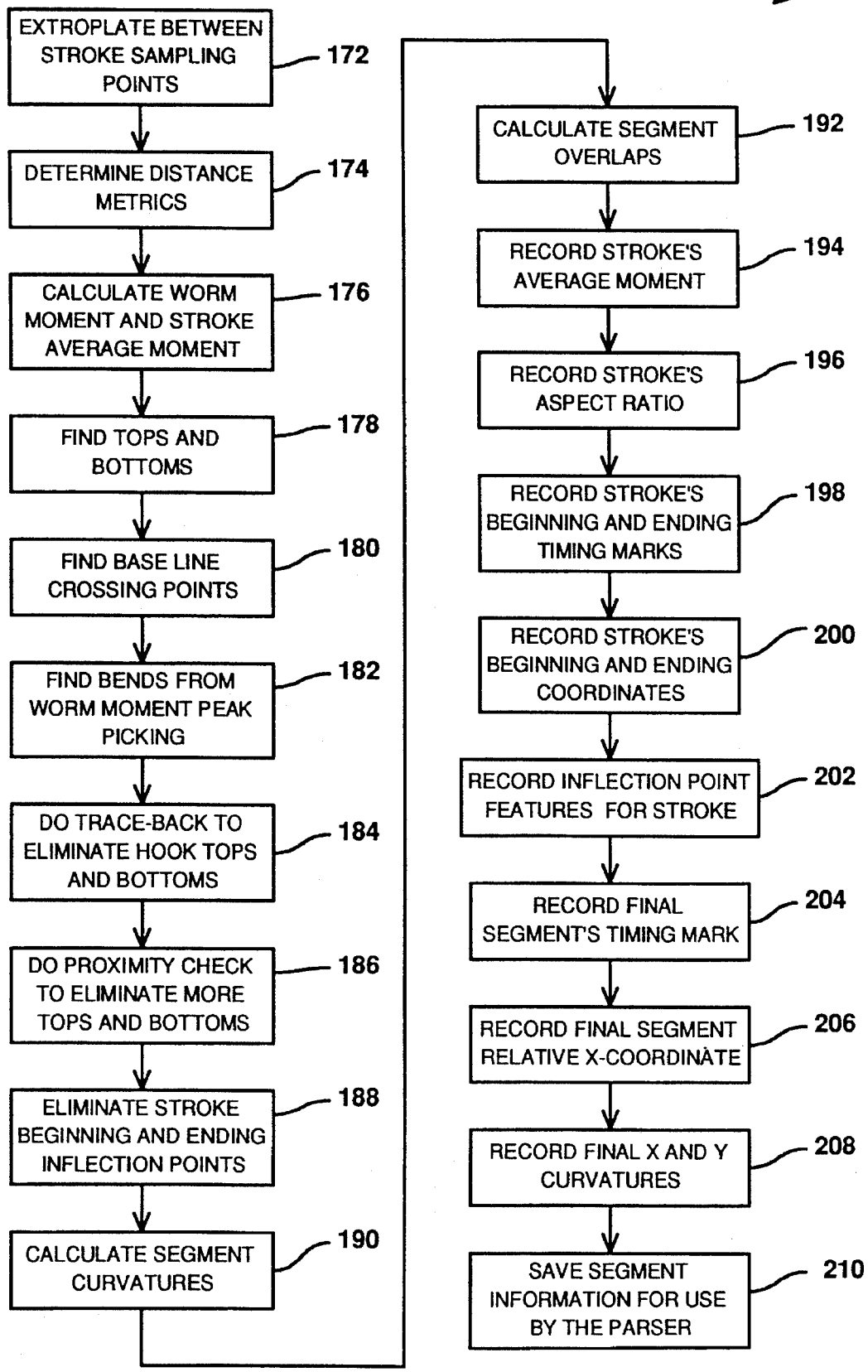
FIG. 7 is a flow chart of the operation of extracting features from each stroke of the group of the time ordered strokes input to the computer.

As represented at block 156, CPU 40 calculates features for each stroke as elaborated upon in FIG. 7 and then, as represented at block 158, saves calculated data.

Looking to FIG. 7, a flow chart is presented describing the operation of extracting features from each stroke as represented generally at 170. The feature calculation commences as represented at block 172 with instructions to extrapolate between stroke sampling points. This is commenced by creating expanded strokes from the user's time ordered sequence of strokes by performing a linear interpolation between each pair of adjacent pixel coordinates of the original strokes. If $x_0$, $y_0$ is one pair of pixel coordinates and $x_1$, $y_1$ the other, then $dx=|x_0-x_1|$ and $dy=|y_0-y_1|$. When CPU 40 determines that dx is greater than dy, and $x_1$ is greater than $x_0$, then for each unit x-coordinate increment between $x_0$ and $x_1$, a y-coordinate is calculated as $y=y_0+(((y_1-y_0)*(x-x_0))/(x_1-x_0))$. When dx is greater than dy, and $x_1$ is less than or equal to $x_0$, then for each unit x-coordinate decrement between $x_0$ and $x_1$, a y-coordinate is determined as $y=y_0+(((y_1-y_0)*(x-x_0))/(x_1-x_0))$. When CPU 40 determines that dx is less than or equal to dy and $y_1$ is greater than $y_0$, then for each unit y-coordinate increment between $y_0$ and $y_1$, an x-coordinate is calculated as $x=x_0+(((x_1-x_0)*(y-y_0))/(y_1-y_0))$. When dx is less than or equal to dy, and $y_1$ is less than or equal to $y_0$, then for each unit y-coordinate decrement between $y_0$ and $y_1$, an x-coordinate is calculated as $x=x_0+(((x_1-x_0)*(y-y_0))/(y_1-y_0))$. If the user has set the timing switch, then a similar linear interpolation is made for the stroke coordinate timing marks.

As represented at step or block 174, CPU 40 then calculates two distance metrics for each coordinate point of each stroke: (1) the distance from a given coordinate point to the previous coordinate point as the square root of the sum of the coordinate differences squared, and (2) the total distance from the beginning of the stroke as the sum of the adjacent coordinate pair distances from the beginning of the stroke to the current coordinate pair under consideration.

Figure 8:
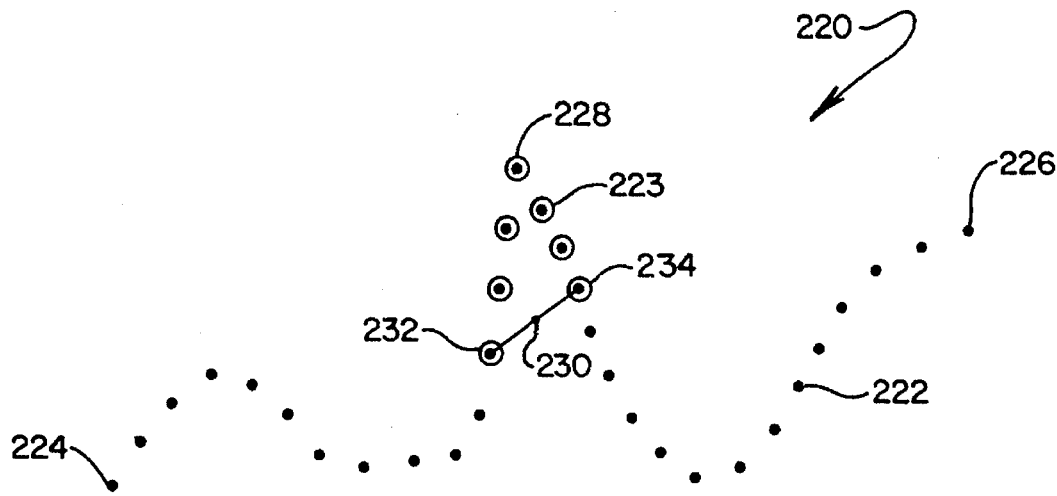
FIG. 8 illustrates a worm superimposed on the time ordered sequence of x/y coordinates representing a user input stroke.

The feature calculation 170 then progresses as represented at block 176 to calculate worm moment and stroke average moment. Referring momentarily to FIG. 8, an illustration is provided of a "worm" superimposed on the time-ordered sequence of x/y coordinates representing a user input stroke. FIG. 8 shows that each stroke represented generally at 220 is represented as a time-ordered sequence of x/y coordinate points, one of which is depicted at 222. CPU 40, operating under control of the word analyzer instructions 140 overlays the "worm" represented by the encircled point at 223 as well as the other encircled ponts, of a specified length over the coordinate points of the stroke, beginning at the start of the stroke represented at point 224, and progressing one coordinate point at a time along the stroke to the end of the array as represented at point 226. For each step of the worm traversal of the stroke, a worm moment is calculated. This worm moment is defined as the square of the distance between the x/y coordinates of the stroke associated with the center point of the worm 228 and the x/y coordinates associated with the mid-point 230 between the two stroke points associated with the beginning 232 and the ending 234 points of the worm. It is, in essence, a measure of the bending of the stroke along the worm. A worm curvature also is calculated as $((x_2-x_0)*(y_1-y_0))-((y_2-y_0)*(x_1-x_0))$ where $x_0$ at $y_0$ are the x- and y-coordinates, respectively, of the stroke coordinate point associated with the beginning of the worm 232, $x_1$ and $y_1$ are the x and y coordinates, respectively, of the stroke coordinate point associated with the end of the worm 234, and $x_2$ and $y_2$ are the x and y coordinates, respectively, of the stroke coordinate point associated with the center of the worm 228. The sum of the worm moments is calculated as the worm inches (one coordinate point at a time) along the stroke from the beginning of the stroke to the end of the stroke. Returning to FIG. 7 and block 176, this sum is then divided by the number of worm moments summed, giving the stroke's average moment as represented at block 176. A plot of the worm moments across the stroke forms a locus of bend parameter.

It shows tall peaks where the stroke bends are sharpest and is zero for straight-line segments in the stroke. This process is carried out for each stroke in the user entered time ordered stroke sequence. CPU 40, operating under the control of word analyzer 140, now looks for tops and bottoms of strokes as represented at block 178. A "top" of a stroke is defined as the high point of a curved section of a stroke as found in an upside-down "U". A "bottom" of a stroke is defined as the low point of a curved section of stroke as is found in a "U". Beginning at a pre-defined coordinate point from the beginning of a stroke and progressing to a pre-defined coordinate point from the end of the stroke, each coordinate point is first examined as a possible top and then examined as a possible bottom.

Figure 9A:
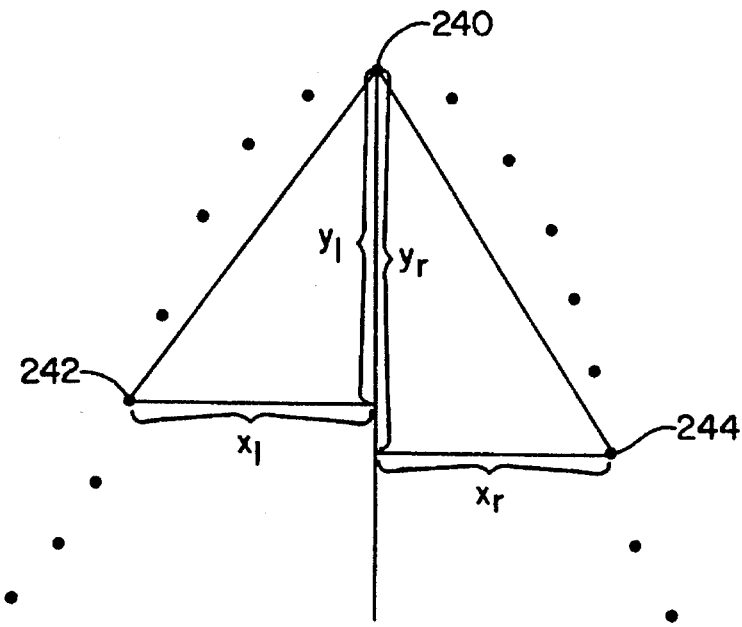
FIGS. 9A and 9B illustrate two methods of finding top and bottom stroke inflection points.

Referring momentarily to FIG. 9A, the examination for possible top is portrayed. As noted, each coordinate point as at 240 is examined as a possible top. If the two adjacent coordinate points are visually lower or equal in height to the current coordinate point, then a top is sought using the following examination: By tracing backwards as represented at point 242, and forwards as represented at point 244, from the current coordinate point, one coordinate point at a time until an end of the stroke occurs or another top or bottom coordinate point is found, or the current coordinate point is classified as a top, the respective slopes of the lines from the current coordinate point 240 to the tracing coordinate points 242, 244 are computed. If these slopes are both found to be greater than a predetermined value, i.e.. $(alpha*y_1)-(beta*x_1)>=0$ and $(alpha*y_r)-(beta*x_r)>=0$ where alpha and beta are predetermined constants) and if the difference is in height between these points ($y_1$ and $y_r$) are both found to be greater than a predetermined value, then the coordinate 240 is classified as a top in the stroke under examination. If not found, the coordinate point 240 under examination now is examined in a similar manner to see if it can be classified as a bottom.

Figure 9B:
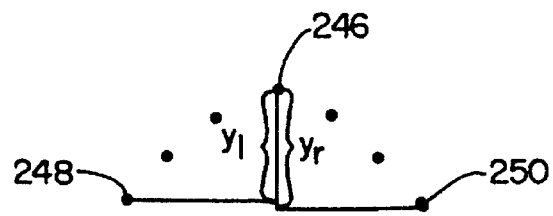

Beginning at a pre-defined coordinate point from the beginning of a stroke and progressing to a pre-defined coordinate point from the end of the stroke, each coordinate point as at 240 now is examined to verify that it is a top or a bottom. If it has been classified as such, then the same procedure as just described is run over the coordinate point to verify that it is really a top or bottom. The reason for performing this twice is the fact that the trace backs are stopped by other tops or bottoms. Thus, the first time through is not as restricted as the second time through is, resulting in possible differences in top and bottom classification. The word analyzer function 140 now looks for tops and bottoms of strokes using a different and less restrictive procedure than that above. Referring to FIG. 9B, beginning at a predetermined coordinate point from the end of the stroke and progressing backwards to a pre-defined coordinate point from the beginning of the stroke, each coordinate point as at 246 now is examined as a possible top or bottom. A similar trace-back of coordinate points 248, 250 is performed as in the previous procedure described in conjunction with FIG. 9A, requiring that each successive coordinate point be lower or equal to (for a top), or higher or equal to (for a bottom) of the current coordinate point under examination. The left or right trace-back is terminated for the specific traceback if the start or end of the stroke is encountered, if another top or bottom coordinate point is encountered, or if the vertical distances $y_1$ or $y_r$ equal or exceed a predetermined minimum value. If this latter condition is true for both the left and right trace-backs, then the current coordinate point under consideration is classified as top or bottom. Each top or bottom found by either of the two methods described above is considered as a stroke inflection point.

Figure 10:
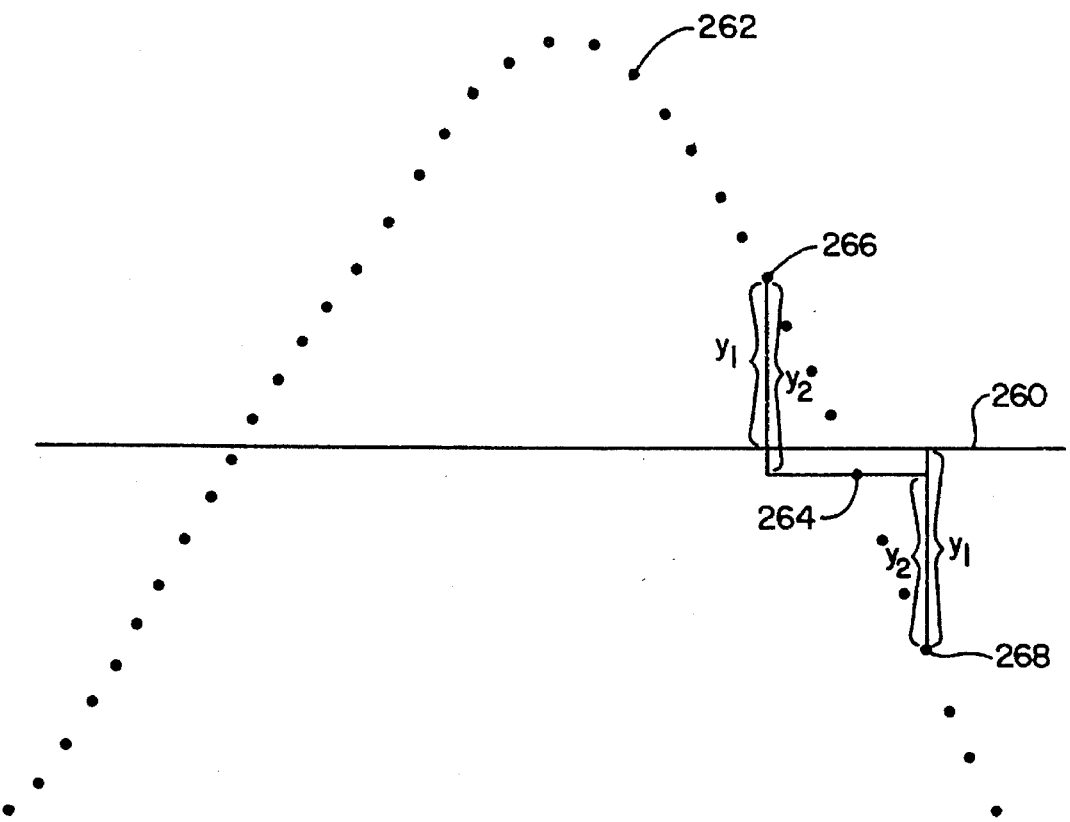
FIG. 10 illustrates the finding of top-to-bottom and bottom-to-top stroke inflection ponts.

As represented at block 180 in FIG. 7, the word analyzer control feature now looks for bottom-to-top baseline crossings. Beginning at a pre-defined coordinate point from the end of a stroke and progressing backwards to a pre-defined coordinate point from the beginning of the stroke, each coordinate point is examined as a possible bottom-to-top baseline crossing coordinate point. Looking additionally to FIG. 10, the baseline is represented as horizontal line 260 and a sequence of coordinate points, for example as represented as dots, one of which is shown at 262 are evaluated. With the procedure, from the given coordinate point 264 under examination, the program performs a trace-back in each direction. The trace-back toward the beginning of the stroke, for example progressing towards point 266, continues as long as the trace-back coordinate point is higher than or equal to the coordinate point under examination, the trace-back coordinate point does not encounter a top or bottom coordinate point, the beginning of the stroke is not encountered, and the distance $y_2$ is less than a predetermined amount. Similar restrictions occur for trace-back toward the end of the stroke, for example, towards point 268. If the respective values of $y_1$ and $y_2$ for both trace-backs are greater than a predetermined amount after the two trace-backs have terminated, then the coordinate points between the two trace-backs are examined, and the one that is closest to the baseline is classified as a bottom-to-top baseline crossing coordinate point. A similar process is executed to find top-to-bottom baseline crossing points. These points then are considered as stroke inflection points along with the tops and bottoms. The first inflection point from the end of each stroke then is considered for removal. If the y-coordinate value of this last inflection point is less than a predetermined value and the difference between this last inflection point's y-coordinate and the stroke's end point y-coordinate is less than a certain value, then the inflection point is removed (unclassified).

Returning to FIG. 7, as represented at block 182, the program now looks for stroke bends by examining the locus of worm moments created earlier. Beginning at a predetermined coordinate point from the beginning of a stroke, the program proceeds to a predetermined coordinate point from the end of the stroke, one coordinate point at a time, examining each coordinate point as a bend coordinate point. This is done by performing trace-backs similar to the previous procedures. However, this time the program examines worm moments associated with the coordinate points. Each trace-back is continued as long as the worm moment associated with the trace-back coordinate point is equal to or less than the worm moment of the coordinate point under consideration, and as long as the difference between the two is less than a predetermined value. If the respective differences between the worm moment associated with the coordinate point under examination and the worm moments associated with both trace-back coordinate points are greater than a predetermined value, then the coordinate point is classified as a bend. Once a classification is made, the coordinate point is verified as a legitimate bend by superimposing the worm over the stroke with the center of the worm at the coordinate point under examination, and requiring that the following Boolean expression be true: ((bn1, 0 AND bn2<0 AND bn3<0) OR (bn1>0 AND bn2<0 AND bn3>0) OR (smoment>val)) where bn1 is a worm curvature associated with the stroke coordinate point located at the beginning of the worm, bn2 is a worm curvature associated with the stroke coordinate point located at the center of the worm, bn3 is a worm curvature associated with the stroke coordinate point located at the end of the worm, smoment is the worm moment associated with the stroke coordinate point located at the center of the worm, and val is a predetermined value. If this Boolean expression is not true, the stroke coordinate point is unclassified as a bend. All stroke bends are considered stroke inflection points along with tops, bottoms, top-to-bottom baseline crossings, and bottom-to-top baseline crossings. However, stroke bends are classified as type 2 stroke inflection (inflection) points whereas all other stroke inflection points are classified as type 1 stroke inflection points.

The control program, as represented at block 184 in FIG. 7, then carries out a bend inflection point trace-back for the purpose of removing hook tops and bottoms, i.e. those type (i.e. one), inflection points that are within hook-like structures of the stroke, where the stroke doubles back on itself, for example as found in a cursive "c" with one or two top inflection points close to the bend inflection point. This component of the program provides first for determining trace-back end-points from the bend inflection point. The traces follow each other, advancing only one trace point at a time, and requiring the advanced point to result in the least divergence of the two trace-back points from each other. This trace-back procedure continues until either the start or end of the stroke is encountered, or the divergence between the two trace-back points is greater than a predetermined value for a predetermined number of trace-back steps. All inflection points from the current bend inflection point to the two trace-back end-points are examined. If any of them lie inside of a hook structure, they are deleted. A source code described algorithm for this feature of the program is annexed hereto as an Appendix A.

Next, as represented at block 186, the program performs a proximity check to eliminate more inflection points. All type 2 bend inflection points are examined for inflection points near to them. If any encountered other inflection points satisfy certain nearness criteria, they are removed (unclassified). A source code rendition of an algorithm for carrying out this feature of the program is annexed hereto as Appendix B.

Next, as represented at block 188, the program examines and removes (unclassifies) any inflection points within a certain number of coordinate points from either end of each stroke. Following this, as represented at block 190, the program provides for the calculation of stroke segment curvatures, where a stroke segment is delimited by either the stroke starting coordinate point, the stroke ending coordinate point, or a stroke coordinate point that is an inflection point. The values of these stroke segment x and y curvatures are associated with the coordinate point at the end of the given segment. The stroke segment x and y curvatures are given by: (x*127/val)*128 AND (y* 127/val)*128, respectively, where x is the difference between the average of the segment's x-coordinate points and the x-coordinate mid-point between the segment's end points; y is the difference between the average of the segment's y-coordinate points, and the y-coordinate mid-point between the segment's end points, and val is a certain percentage of the diagonal of the stroke segment's bounding box.

Next, looking to block 192, the program provides for the calculation of the percentage horizontal x-coordinate overlap between two contiguous stroke segments as is found in a cursive "e". This value is a function of the intersection of their x-coordinate spans over the union of their x-coordinate spans. The value is calculated for each contiguous segment pair for each stroke in the user-entered time-ordered stroke sequence and is associated with that coordinate point that is the common inflection point between the adjacent segments.

As represented at block 194, the program then provides for the calculation of the normalized stroke average moment and saves it in the FIFO stack. Then, as represented at block 196, it saves the stroke aspect ratio in the FIFO stack. If the user has set the timing switch for signature verification, the program provides for recording the stroke's beginning and ending timing marks as represented at step 198 and records that information in the FIFO stack.

As represented at block 200, the program then provides for the calculation of the stroke's beginning and ending x- and y-coordinate features and the saving of that information in the FIFO stack. In this regard, $x_0$, $y_0$ are defined to be the stroke's beginning x- and y-coordinate features, respectively, $x_1$, $y_1$ to be the stroke's ending x- and y-coordinate features, respectively, sxmin, symin to be the stroke's minimum x- and y-coordinate features, respectively, sxmax, symax, to be the stroke's maximum x- and y-coordinate features, respectively, xmin, ymin, to be the word's minimum x- and y-coordinates, respectively, xmax, ymax to be the word's maximum x- and y-coordinates, respectively, $y_b$ to be the stroke's beginning y-coordinate value, $y_e$ to be the stroke's ending y-coordinate value, $x_b$ to be the stroke's beginning x-coordinate value, and $x_e$ to be the stroke's ending x-coordinate value. If the stroke was classified as a dot, then:

If xmax equals xmin, then $x_0=0$ and $x_1=0$; otherwise, $x_0=255 *$ (sxmin-xmin)/(xmax-xmin) and $x_1=255 *$ (sxmin-xmin)/(xmax-xmin)

If ymax equals ymin, then $Y_0=0$ and $y_1=$); otherwise $y_0=255 *$ (symin-ymin)/(ymax-ymin) and $y_1=255 *$ (symin-ymin)/(ymax-ymin) If the stroke was classified as a vertical line, then:

If xmax equals xmin, then $x_0=0$ and $x_1=0$; otherwise $x_0=255 *$ (sxmin-xmin)/(xmax-xmin) and $x_1=255 *$ (sxmin-xmin)/(xmax-xmin)

If ymax equals ymin, then $y_0=0$ and $y_1=0$; otherwise $y_0=255 *$ ($y_b$-ymin)/(ymax-ymin) and $y_1=255 *$ ($y_e$-ymin)/(ymax-ymin) If the stroke was classified as a horizontal line, then:

If xmax equals xmin, then $x_0=0$ and $x_1=0$; otherwise, $x_0=255 *$ ($x_b$-xmin)/(xmax-xmin) and $x_1=255 *$ ($x_e$-xmin)/(xmax-xmin)

If ymax equals ymin, then $y_0=0$ and $y_1=0$; otherwise $y_0=255 *$ (symin-ymin)/(ymax-ymin) and $y_1=255 *$ (symin-ymin)/(ymax-ymin) If the stroke was classified as a general stroke, then:

If xmax equals xmin, then $x_0=0$ and $x_1=0$; otherwise, $x_0=255 *$ ($x_b$-xmin)/(xmax-xmin) and $x_1=255 *$ ($x_e$-xmin)/(xmax-xmin)

If ymax equals ymin, then $y_0=0$ and $y_1=0$; otherwise $y_0=255 *$ ($y_b$-ymin)/(ymax-ymin) and $y_1=255 *$ ($y_e$-ymin)/(ymax-ymin)

Figure 11:
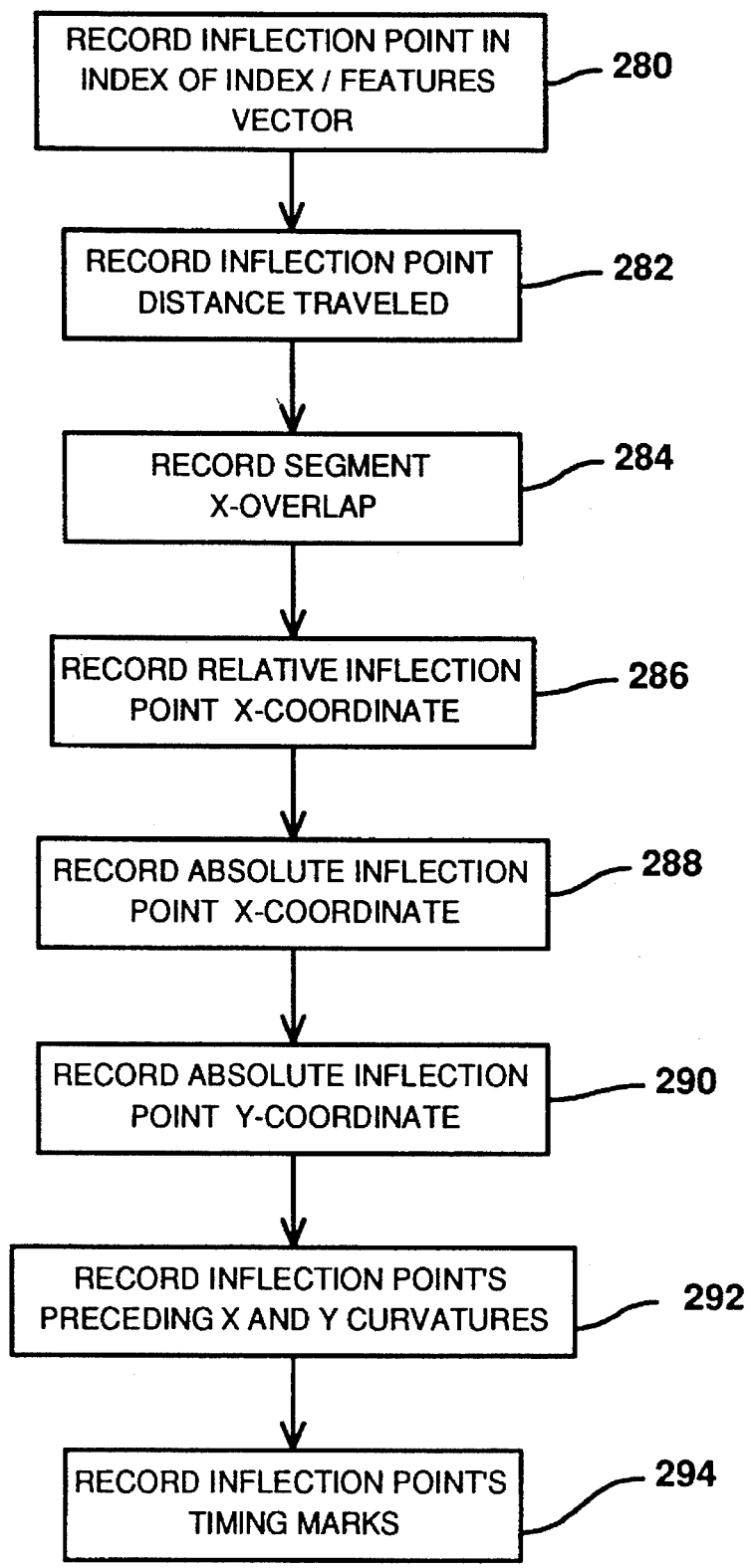
FIG. 11 is a flow chart of the operation of extracting and recording features from the inflection points of each stroke of the time ordered strokes input to the computer by the user.

As represented at block 202, the program then provides for the calculation and recordation of inflection point data for each stroke. Looking additionally to FIG. 11, this procedure is portrayed in a higher level of detail. In FIG. 11, as represented at block 280, the procedure commences by recording the existence of the inflection point in the index/feature vector. Then, as represented at block 282, the program saves in the FIFO stack the total distance traveled of the inflection coordinate point from the beginning of the stroke, which distance was calculated earlier. Then, as represented at block 284, the program saves in the FIFO stack the segment x-coordinate overlap previously calculated. Then, as represented at block 286, the relative x-coordinate of the inflection point is calculated and saved in the FIFO stack. The relative x-coordinate of the inflection point is a function of the x-coordinate distance from the last inflection point (or beginning of the stroke). The program then proceeds, as represented at block 288 to carry out the calculation and saving in the FIFO stack of the absolute x-coordinate of the inflection point which is a function of the difference of the x-coordinate distance of the inflection point from the minimum x-coordinate value of the stroke to the x-coordinate span of the stroke. If this span is 0, then the calculated value is 0. The program then proceeds, as represented at block 290, by calculating and saving in the FIFO stack the absolute y-coordinate of the inflection point, which is a function of the difference of the y-coordinate distance of the inflection point from the minimum y-coordinate value of the stroke to the y-coordinate span of the stroke. If this span is 0, then the calculated value is 0. Then, as represented at block 292, the program provides for saving in the FIFO stack the segment's x and y curvatures associated with the inflection point. If the user has set the timing switch for signature verification, then, as represented at block 294, the timing difference between the current inflection point and the previous inflection point is saved in the FIFO stack.

Returning to FIG. 7, after all inflection points have been processed and if the user has set the timing switch for signature verification, then, as represented at block 204, the timing difference between the stroke end point and the last inflection point (or beginning point if there are no inflection points) is saved in the FIFO stack. The program then proceeds, as represented at block 206, to calculate and save in the FIFO stack the final relative x-coordinate, calculated as above, except if the stroke is classified as a dot, vertical line, or horizontal line, then this value is 128. The final x and y segment curvatures associated with the stroke's end point are saved in the FIFO stack as represented at block 208, and the program functions to set a stroke terminator mark in the index of the index/feature vector. Finally, as noted at block 210, segment information for use by the parser is saved.

After all strokes have been processed as described above, the program effects the carrying out of removal of all features from the FIFO stack and the placement of them in the index/feature vector as provided in conjunction with block 158 in FIG. 6. This completes the word analysis of the user entered time-ordered stroke sequence, resulting in an index/feature vector that may be used for searching or updating the user specific sample recognition data-base file.

Figure 12:
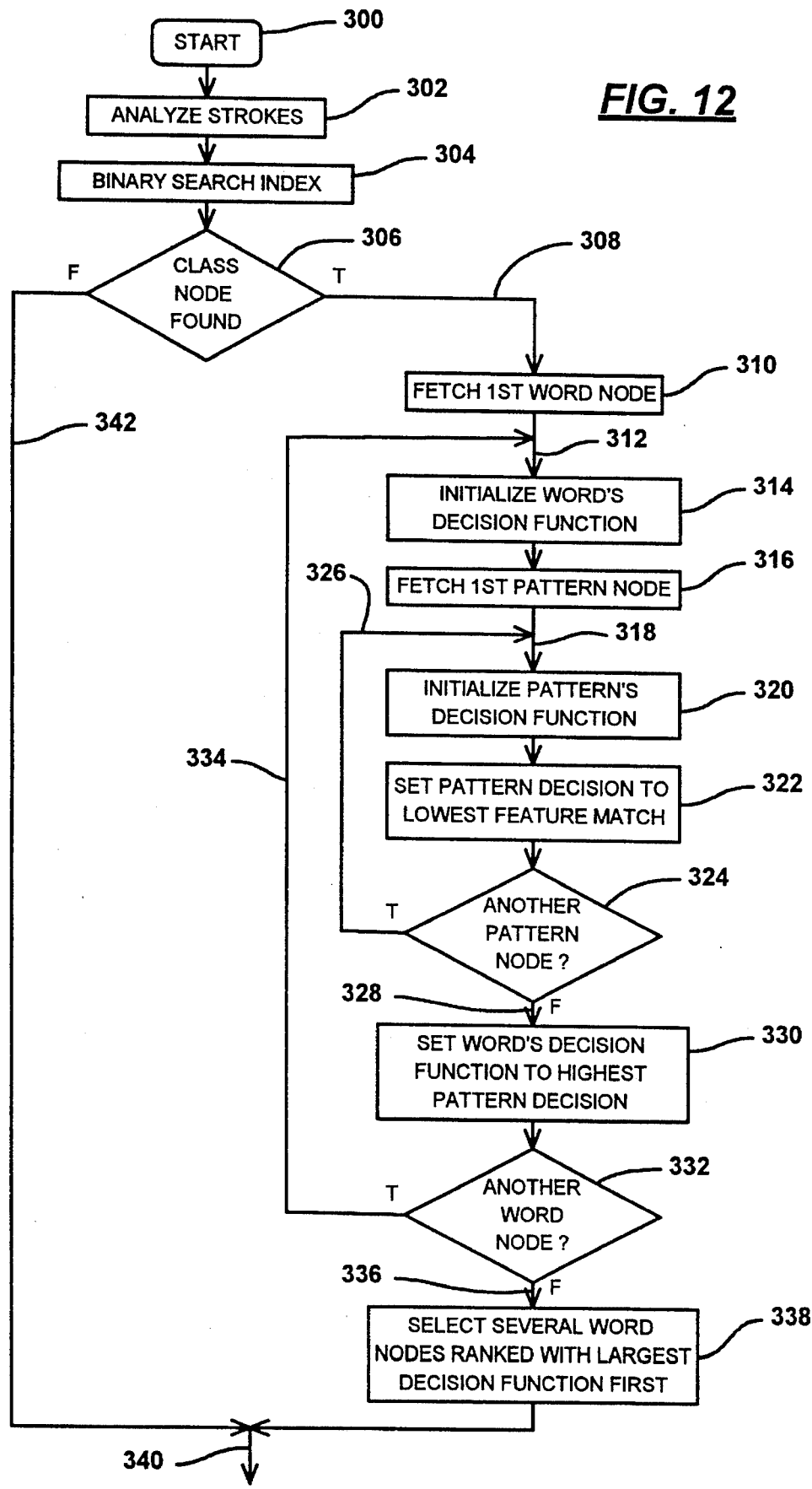
FIG. 12 is a flow chart of the operation of finding candidate recognition results when an unknown group of strokes is sent to the word-level recognizer.

Looking to FIG. 12, the operation of finding candidate recognition results when an unknown group of strokes is sent to or evaluted by the word-level recognizer feature is presented in diagrammatic form. Commencing as shown at block 300, the word level recognizer function of the program receives a user entered time-ordered stroke sequence for the purpose of recognizing the set of strokes as a string of text. Initially, as represented at block 302, the strokes are sent to the word analyzer function as described in conjunction with FIG. 6, receiving back an index/feature vector that represents the analysis of the stroke group. Next, the word level recognizer component of the program carries out the task of finding the closest match of this index/feature vector in the memory data storage 54 (FIG. 3B). The program, therefore, functions to take the index from the index/feature vector and run a binary search over the class nodes 82 using the class node index 80 (FIG. 3B). This search is represented in FIG. 12 at block 304. If no match is found between the index and the class node index, then the word-level recognizer function of the program returns to the caller without a successful recognition. If, however, an index match was found as represented at decision symbol 306, in the binary search of class node index 80, then as represented at line 308 and block 310, then a search over all words associated with a linked list with the found class node is made to find the word with the best match with the index/feature vector from the word analyzer. It should be understood that the term "word" used herein refers to a string of text recorded in Unicode, that may have blank spaces in it, i.e. it may consist of several actual words. The program now functions to select the first word node as represented at block 310 in the class nodes linked list of word nodes for examination and as represented at line 312 and block 314, initializes the word's decision function to null. The word node will have a linked list of one or more pattern nodes associated with it. These pattern nodes have feature vectors, each one representing a sample pattern that was created from actual user input at some time in the past and saved in the user specific sample recognition data-base 48 (FIG. 2) and subsequently loaded into the memory data storage 54 (3B).

The program now functions to fetch the first pattern node as represented at block 316 to examine each feature of that pattern node with respect to each feature of the feature vector from the word analyzer. Then, as represented by line 318 and block 320, the program first initializes the pattern node decision function to a maximum value and then proceeds to examine each feature of the pattern node against each feature of from the feature vector from the word analyzer. As it does so, the pattern node's decision function is set to the lowest feature match as represented at block 322. A feature match is greatest (255) when the pattern node's feature is exactly the same as the feature vector's feature. It becomes lower as the divergence of the feature vector's feature from the pattern's node's feature increases. This match is, therefore, a function of the absolute value of the difference of the feature vectors feature and the pattern node's feature, divided by the pattern node's feature. When the pattern node's decision value has been set, the program then looks for another pattern node as represented by the query at symbol 324. Where another pattern node is present, then as represented by line 326 extending to 318, the process is repeated with a return to the instructions represented at block 320. In the event of a negative determination with respect to the inquiry at symbol 324, then as represented at line 328 and block 330, the program functions to set the word node's decision function to the highest pattern node decision function that was found in the linked list of pattern nodes associated with the word node. Then, as represented at decision symbol 332, the program looks for another word node and, in the presence of such other word node, as represented at line 334, the program reverts to line 312 and commences with the instructions represented at block 314 with such new word node, if one were found. In the event of a negative determination with respect to the inquiry at symbol 332, then as represented at line 336 and block 338, the program provides for the selection of several word nodes ranked with the largest decision function first. The selected word nodes' decision functions are normalized to 100 maximum. If these word nodes' largest decision functions were greater than or equal to a user set low recognition cut-off, then the program returns to the caller with the Unicode strings associated with the word nodes; otherwise, it returns an unrecognized flag. The program then exits as represented at line 340.

Returning to decision symbol 306, where a class node is not found, then, as represented at lines 342 and 340, the program returns with no result.

Figure 13:
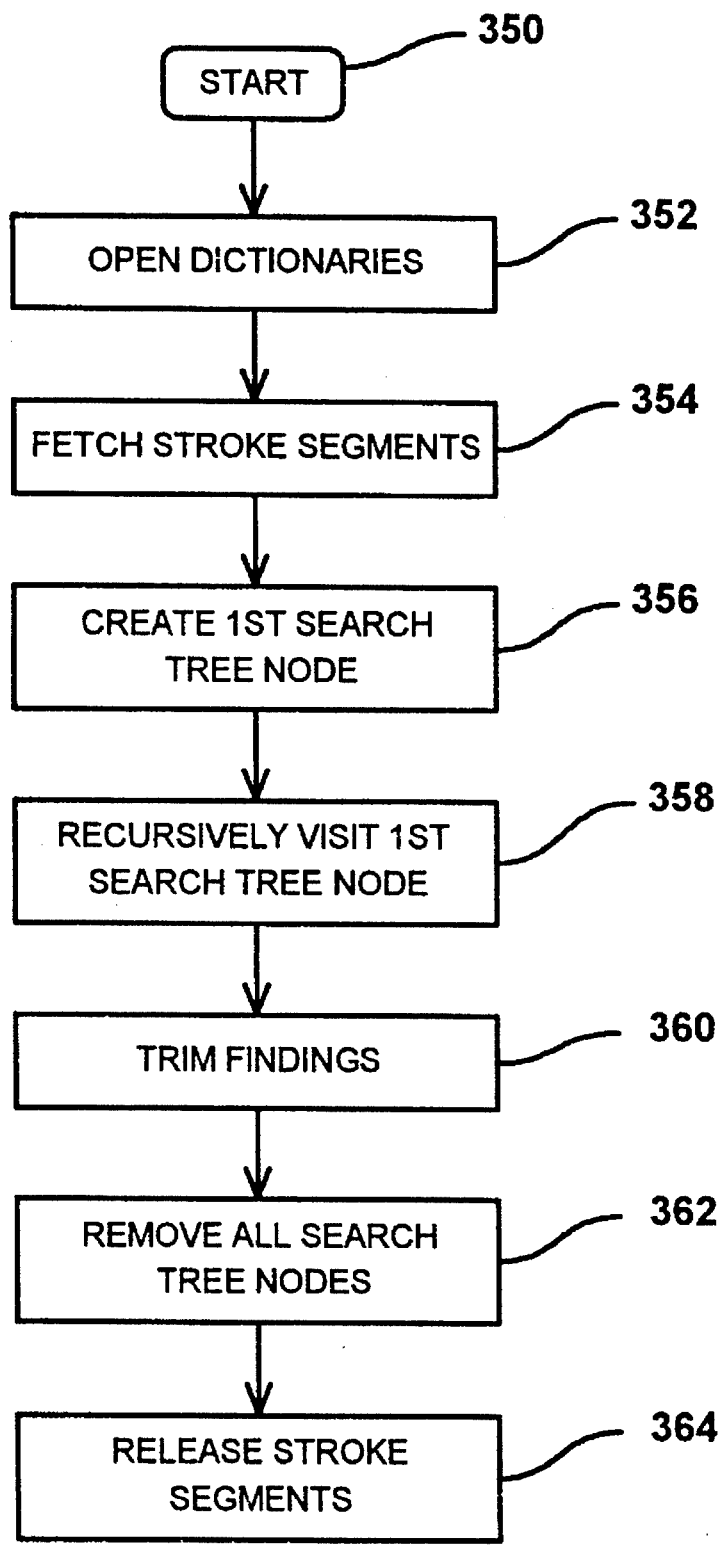
FIG. 13 is a flow chart of the operation of finding candidate recognition results when an unknown group of strokes is sent to the parser-level recognizer.

Referring to FIG. 13, a parser level recognizer feature of the program is represented in flow chart fashion. This recognizer function carries out the operation of finding candidate recognition results when an unknown group of strokes is sent to the parser level recognizer. In the parser level recognizer performance, a program recognizes groups of stroke segments at a time, thereby breaking an unknown word into parts that it can recognize individually, and then bulding a resulant recognition from these recognized pans. As represented at start node 350 and block 352, this component of the program begins by opening dictionary files (block 70 in FIG. 3A) which are used to determine the legitimacy of candidate recognition strings. Then, as represented at block 354, the program fetches the stroke segments that were previously created by the word analyzer. Then, as represented at block 356, there is created the first search tree node. Each such search tree node represents a specific combination of stroke segments; the first search tree node represents the first stroke segment from the first time ordered stroke sequence stroke. These stroke segments are formed from the stroke segmentation process generated by the word analyzer, except that each segment considered by the parser feature must be delimited by either a stroke beginning or ending point, or by a stroke inflection point that is close to the baseline. Thus, a parser stroke segment may consist of one or more contiguous segments created by the word analyzer. Then, as represented at block 358, the program recursively (or by simulated recursion) visits the first search tree node created as described in connection with block 356. This recursive visit causes other search tree nodes to be created and visited with recognized strings being returned. Recognized strings may consist of both complete strings and/or partial strings. A complete string is a word recognized by using all segments of all strokes in the user entered time ordered stroke sequence. A partial string is a word or word piece recogized by using some but not all of the segments from the strokes in the user-entered time-ordered stroke sequence. Partial string returns are indicated by suffixing them with a special character such as an asterisk. Then, as represented at block 360, when all potential candidates are in, these findings are trimmed such that if one or more complete strings were found, then any partial strings are removed from the list of recognized strings. Then, as represented at block 362, all created search tree nodes are removed to free up internal memory space. Then, as represented at block 364, stroke segments are released that were fetched initially, again freeing up internal memory space.

Figure 14:
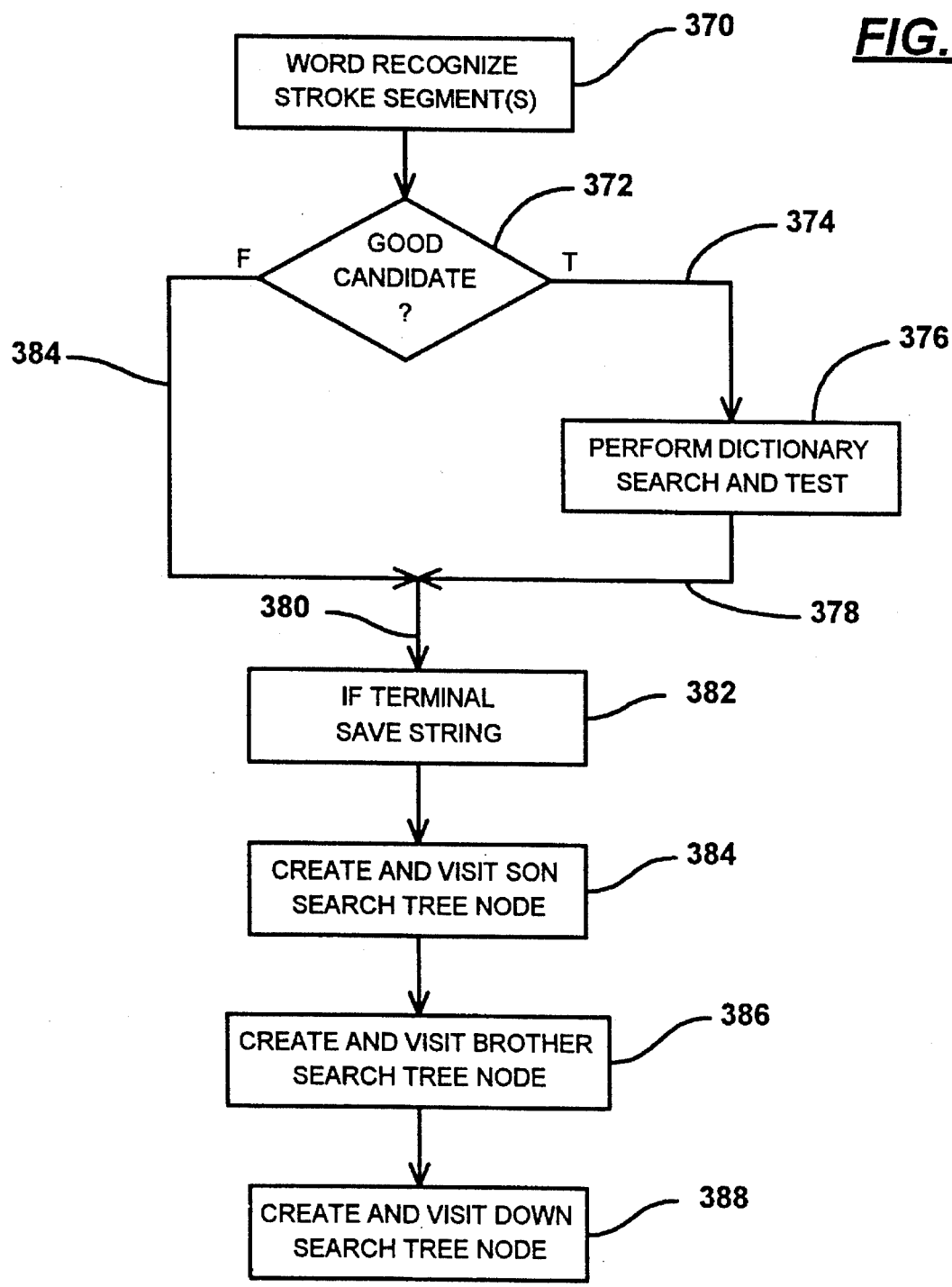
FIG. 14 is a flow chart of a recursive visiting of search tree nodes during the operation of finding candidate recognition results when an unknown group of strokes is sent to the parser-level recognizer.

Several operations are performed by the parser-level recognizer feature of the program when the search tree node visiting functions associated with the instructions at block 358 are carried out. Such activities are further described in conjunction with FIG. 14. Looking to that figure, the program first sends the stroke segments associated with the search tree node to the word level recognizer as represented at block 370. If there was at least one return string and the confidence level of the best (first) return is greater or equal to the user set low recognition cut-off, then this string becomes a good recognition candidate for the stroke segments associated with the search tree node being visited as shown by an inquiry provided at symbol 372 with the result of a good candidate affirmation being represented at line 374 extending to block 376. An extended string then is formed, with this return result as a base, and previous (father) return results being concatenated to the left of this. As represented at block 376, the resultant string is then checked in the dictionary if requested by the caller to the parser-level recognizer, for legitimacy as a complete or partial word. If it is not found in the dictionary, then the result returned from the word-level recognizer is deleted as if not recognized. If the caller to the parser had not specified a dictionary check, then the return result from the word-level recognizer is accepted as good. The program then continues as represented, for example, at lines 378 and 380, to the instructions represented at block 382. Similarly, in the event that a good candidate determination is not made with respect to symbol 372, the program continues as represented at lines 384 and 380 to block 382.

At block 382, the program effects an examination of the current search tree node to see if it is a terminal node, i.e. one in which the stroke segments considered are the last of available stroke semgents to be considered. If it is a terminal node, a complete or partial result is constructed from the return of the word-level recognizer and the recognized strings of the previous (father) search tree nodes in the same manner as noted above. This constructed string then is saved as a recognition candidate with a recognition confidence level given by the smallest recognition confidence level of all the search tree nodes involved in the construction that had recognized strings.

Next, the program determines whether a son node can be created and visited. If so, as represented at block 384, it is accordingly created and visited. In general, the son node created consists of the same stroke segments as the son node's originator node with the addition of the next chronological stroke added to the combination of strokes, but with no segments of this new stroke selected. This new stroke also is set as the main stroke for the node. If there are no additional strokes to create a son node, then a next step is executed. In particular, after returning from visiting a son node, a brother node is created and visited. This consists of the same stroke segments as the node's originator node but with the addition of the next contiguous segment of the current node's main stroke and the procedure is represented at block 386. If there are no additional segments in the node's main stroke, then the next step is executed. After returning from visiting a brother node and if the node's stroke segment combinations have been recognized, then as represented at block 388, a down node is created and visited. This new node's stroke segment combination is formed by removing from further consideration any of the current node stroke segments and beginning with the first available chronological stroke segment. After returning from the down node, the program returns to the caller of the current search tree node.

Figure 15:
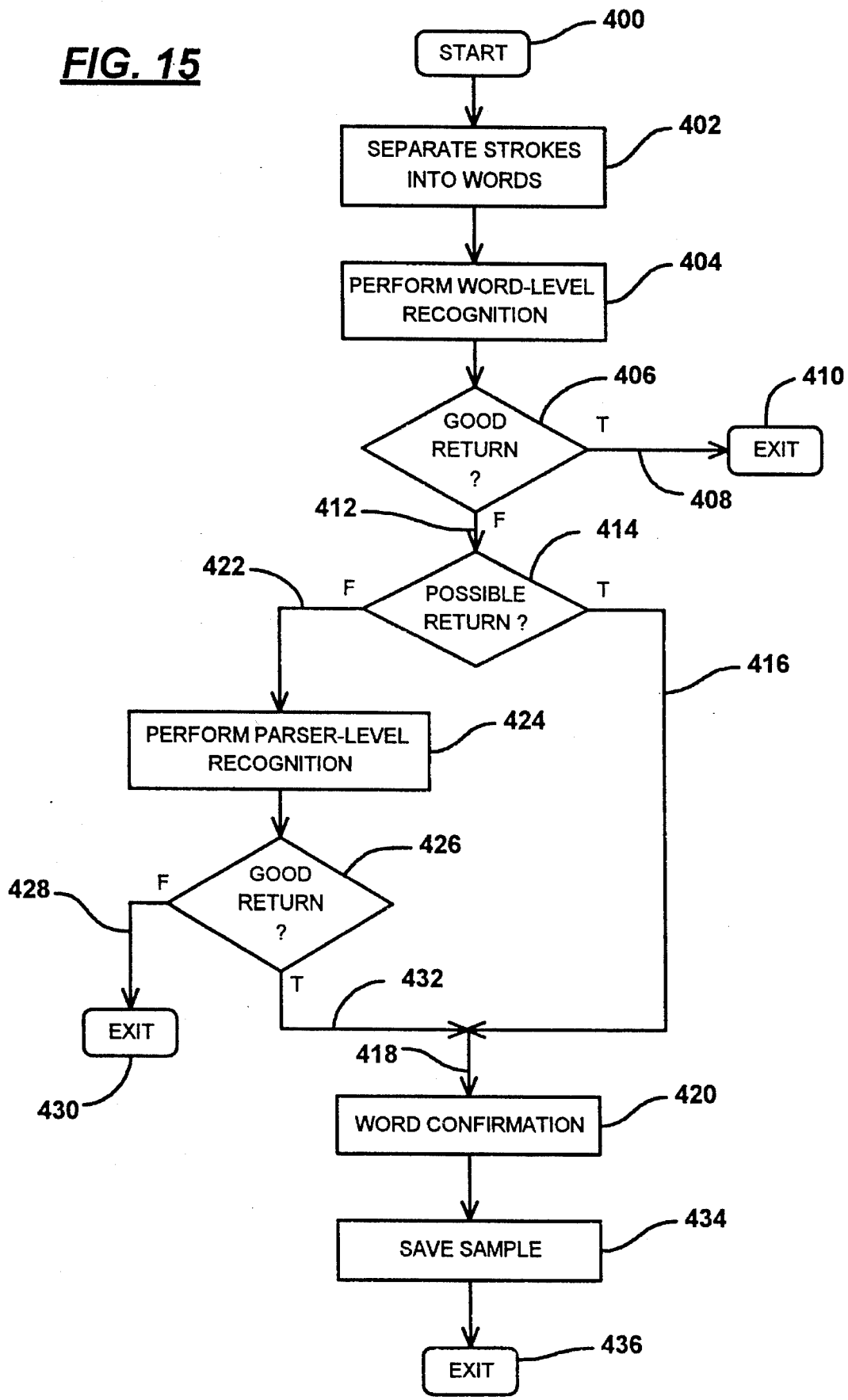
FIG. 15 is a flow chart illustrating search strategy used during a recognition process which includes possible user input and saving of a new sample to the user specific sample data-base file.

Referring to FIG. 15, one of several possible recognition controller scenarios controlling the process of recognition is portrayed. Commencing at the start node 400, the instant program functions, as represented at block 402 initially to separate all strokes received into stroke groups such that each group is separated horizontally by a minimum user-defined inter-word spacing value. Each of these groups is treated as a single handwritten word. This separation process also may consist of checking the vertical separation of strokes so that words on different "lines" will not be grouped together. Then, as represented at block 404, the program processes each of these stroke groups, one at a time. It first sends the strokes in a stroke group to the word-level recognizer. Then, the test represented at symbol 406 is made to determine whether or not a recognition string was returned with a confidence level greater than or equal to a user pre-set upper recognition cut-off value. If that is the case, then as represented at line 408 and node 410, the controller exits with this recognition string as its chosen return.

If the recognition string was returned with a confidence level less than a user pre-set upper recognition cut-off value, but greater than or equal to a user preset lower recognition cut-off value, as represented by the decision formed at symbol 414, then as represented at lines 416, 418, and block 420, the program executes the word confirmation process.

If, however, there was no recognition string returned by the word-level recognizer or the recognition string was returned with a confidence level less than a user preset lower recognition cut-off value, then, as represented at line 422 and block 424, the strokes involved in the recognition are sent to the parser-level recognition if the parser-level recognizer has been activated by the user. The program then proceeds to the decision symbol 426 to determine whether the parser-level recognizer returns at least one complete recognition string with a confidence level greater than or equal to a user preset upper recognition cut-off value. If that is the case, then as represented at line 428 and node 430, the controller exits with this recognition string as its chosen return, unless the user has specified an automatic word confirmation with the parser-level recognizer. In the latter case, or, as represented by lines 432, 418, and block 420, if the parser-level recognition string has a confidence level less than a user preset upper recognition cut-off value or is a partial recognition, then the strokes are sent to a word confirmation process as represented at earlier-noted block 420. In connection with the word confirmation carried out in conjunction with block 420, the user can instruct the program in the word confirmation process to: (1) save the word-analyzed index/feature vector of the strokes with the user corrected or confirmed text as a new sample in the user specific sample recognition database 60 (FIG. 3A) as represented at block 434, and concurrently update the memory data storage 54 (FIG. 3B) and (2) as represented at node 436, return the user corrected or confirmed text to the caller of the recognition controller. When the user performs option (1) above, the user specific sample recognition data-base file is augmented, such that subsequent recognition is improved from the current recognition level. This kind of system is called a dynamic learning system and can improve in the manner described to approach 100% recognition with continued use by a specific user.

The various controllers within the program are themselves directed by certain user preset flags or values represented at block 78 in FIG. 3B. These parameters can be listed as follows:

Word Recognition On Flag
Parsing On Flag
Auto Word-Confirmation On Parse Flag
Writing Direction Flag
Maximum Stroke Segments
Maximum Complete Recognitions
Upper Recognition Cutoff
Lower Recognition Cutoff
Inter-Line Spacing
Inter-Word Spacing
Timing Flag For Signature Verification
Recognition Text Considering the above listing *seriatim*, if the "Word Recognition On Flag" is set, then the recognition controller is directed to use the word-level recognizer. If the "Parsing On Flag" is set, then the recognition controller is directed to use the parser-level recognizer, if the word level recognizer does not return an acceptable recognition string. If the "Auto Word-Confirmation On Parse Flag" is set, then the recognition controller will always call the word confirmation process whenever the parser is called. The recognition controller uses the setting of the "Writing Direction Flag" (either "left-to-right" or "right-to-left") in the logic that divides a group of strokes into stroke groups representing words. The "Maximum Stroke Segments" value is the maximum number of contiguous parser stroke segments that the parser will consider at one time in the recognition process. The "Maximum Complete Recognitions" value causes the parser to abort further recognition if it produces this number of complete recognitions. The recognition controller considers a recognized string as good with no further processing necessary if its confidence level is equal to or greater than the "Upper Recognition Cutoff" value. The recognition controller treats any recognition string with a confidence level of less than the "Lower Recognition Cutoff" as if the recognition string was not returned by the recognizer. The parser-level recognizer also uses this value in a similar manner when examining word-level recognition strings of stroke segment groups. The "Inter-Line Spacing" value is used by the word analyzer in calculating such features as the relative word bottom location and the relative word height. The "Inter-Word Spacing" value is used by the controller in grouping strokes into stroke groups that represent individual words. If the "Timing Flag For Signature Verification" is set, then the word analyzer will use the stroke timing information as features on both a word and stroke level. The recognition string returned by the handwriting recognition system will be in a format according to how the "Recognition Text" parameter is set, i.e. for Unicode, ANSI, or JIS.

Since certain changes may be made in the above-described method and system without departing from the scope of the invention herein involved, it is intended that all matter contained in the description thereof or shown in the accompanying drawings shall be interpreted as illustrative and not in a limiting sense.

APPENDIX A

```
/* Do trace-back to elliminate hook tops and bottoms */
for (k = 1; k < cst;k++)
{
  if(CurStroke[k].b == 2)
  {
    /* Find end-points of trace-back */
    nn = 0;
    ill = il = k - 1;
    irl = ir = k + 1;
    gut = TRUE;
    while (gut)
    {
      if (il == 0) iln = 0;
      else iln = il - 1;
      if (ir == cst) irn = cst;
      else irn = ir + 1;
      x0s = labs(rCurStroke[il].x - rCurStroke[irn].x);
      y0s = labs(rCurStroke[il].y - rCurStroke[irn].y);
      al = (x0s * x0s) + (y0s * y0s);
      x1s = labs(rCurStroke[iln].x - rCurStroke[ir].x);
      y1s = labs(rCurStroke[iln].y - rCurStroke[ir].y);
      bl = (x1s * x1s) + (y1s * y1s);
      if (al < bl)
      {
        ir = irn;
        if (al > lthrs) nn++;
        else {
```

APPENDIX A -continued

```
          nn = 0;
          ill = il;
          irl = ir;
        }
      }
      else {
        il = iln;
        if(bl > lthrs) nn++;
        else {
          nn = 0;
          ill = il;
          irl = ir;
        }
      }
      if (il == 0 || ir == cst || nn > 10) gut = FALSE;
    }
    ill = k - (9 * (k - ill) / 10);
    if (ill == k) ill = k - 1;
    irl = k + (9 * (irl - k) / 10);
    if(irl == k) irl = k + 1;
    /* * Look for inflexion points to delete */
    il = k;
    ir = k;
    found = TRUE;
    while (found)
    {
      if (il > in) il—;
      if (ir < irl) ir++;
      if (CurStroke[il].b > 0 || CurStroke[ir].b > 0)
      {
        ilz = (2 * il) - k;
        if (ilz = 0) ilz = 0;
        irz = (2 * ir) - k;
        if (irz > cst) irz = cst;
        x0 = rCurStroke[ilz].x - rCurStroke[k].x;
        x1 = rCurStroke[irz].x - rCurStroke[k].x;
        gut = TRUE;
        if (CurStroke[ir].b > 0)
        {
          irn = ir + (ir - k);
          if (irn <= cst)
          {
            x0s = labs(rCurStroke[il].x - rCurStroke[ir].x);
            y0s = labs(rCurStroke[il].y - rCurStroke[ir].y);
            al = (x0s * x0s) + (y0s * y0s);
            x1s = labs(rCurStroke[k].x - rCurStroke[irn].x);
            y1s = labs(rCurStroke[k].y - rCurStroke[irn].y);
            bl = (x1s * x1s) + (y1s * y1s);
            if (bl < al) gut = FALSE;
          }
        }
        if ((x0 >= 0L && x1 >= 0L) ||
            (x0 < 0L && x1 = 0L))
        {
          CurStroke[il].b = 0;
          if (gut) CurStroke[ir].b = 0;
        }
      }
      if (il == ill && ir ==irl) found = FALSE;
    }
  }
}
```

APPENDIX B

```
/* Do proximity checks to elliminate more tops and bottoms */
lxi = 5;
lx = ((long) lxi) << shft;
for (i = WormLength; i < (cst - WormLength); i++)
{
  if (CurStroke[i].b == 2)
  {
```

APPENDIX B -continued

```
iii = i;
while (iii > 0 && (i - iii) <= (lxi) &&
    labs(rCurStroke[iii].y - rCurStroke[i].y) < lx) iii--;
iiii = i;
while (iiii < cst && (iiii - i) <= (lxi) &&
    labs(rCurStroke[iiii].y - rCurStroke[i].y) < lx) iiii++;
for (k = iii; k <= iiii; k++)
{
    if (CurStroke[k].b == 1)
    {
        if (Moment[i-WormLength].isum > 3000000L &&
            labs(rCurStroke[k].y) > lx)
            CurStroke[k].b = 0;
        else CurStroke[i].b = 0;
    }
    else if (CurStroke[k].b == 2 && k != i)
    {
        lk = labs(rCurStroke[k].y);
        li = labs(rCurStroke[i].y);
        if (lk <= ix && li <= lx)
        {
            if (li < lk) CurStroke[k].b = 0;
            else CurStroke[i].b = 0;
        }
        else if (lk <= lx)
        {
            CurStroke[i].b = 0;
        }
        else if (li <= lx)
        {
            CurStroke[k].b = 0;
        }
        else {
            if (Moment[k-WormLength].isum >
                Moment[i-WormLength].isum) CurStroke[i].b = 0;
            else CurStroke[k].b = 0;
        }
    }
}
}
```

I claim:

1. A system for the symbolic-based recognition of a handwriting input to an input surface having an output provided as a stream of coordinate data points, comprising:

a data base memory storing a compilation of text-pattern pairs, said pattern of each pair having been derived as sample features of said handwriting and including an associated sample index derived as aspects of said handwriting sample features, said text of each said pair representing at least one predetermined character glyph;

a processor, responsive to said output to extract pattern test features and a corresponding test index therefrom, responsive to access said memory stored compilation and identify a said sample index corresponding with said test index, responsive to carry out a comparison of said pattern test features with said pattern sample features associated with said identified sample index, responsive in the presence of a correspondence between said pattern test and sample features to derive output signals corresponding with said text associated with said pattern sample features;

said pattern sample and test features including index based features derived from the stroke defining sequences of said data points representing a word and comprising a first index component provided as a value corresponding with the total number of strokes comprising a word, a second index component provided as a value corresponding with the number of inflection points of a stroke, wherein such inflection points comprise a significant bend in a stroke, a top location, a bottom location and a baseline crossing point in the stroke, and a third index component provided as a value corresponding with the termination of inflection point index components for a given stroke; and display means responsive to said derived output signals for effecting the publication of a said predetermined character glyph of said text associated with said pattern sample features.

2. The system of claim 1 in which said pattern sample and test features include:

a first word feature provided as a value corresponding with the relative word bottom location of a said output representing a word;

a second word feature provided as a value corresponding with the relative height of a said output representing a word; and a third word feature provided as a value corresponding with the aspect ratio of a said output representing a word.

3. The system of claim 1 in which said pattern sample and test features include stroke based features derived from each stroke defining sequence of said data points and comprising:

a first stroke feature provided as a value corresponding with the worm moment based average moment of a stroke;

a second stroke feature provided as a value corresponding with the aspect ratio of a stroke; and a third stroke feature provided as a value corresponding with the beginning and ending locations of a stroke relative to a dimension of a word within which such stroke is incorporated.

4. The system of claim 1 in which said pattern sample and test features include segment based features derived from each segment of each stroke defining sequence of said data points and comprising:

a first segment feature provided as a value corresponding with the accumulated distances between sequential pairs of said data points defining a stroke from the beginning of a stroke to the end of a segment of a stroke, relative to the total distance from the beginning of the stroke to the end of the stroke;

a second segment feature provided as a value corresponding with the x-coordinate overlap between two adjacent segments of a stroke; and a third segment feature provided as a value corresponding with the relative x-coordinate based distance between adjacent inflection points of a stroke.

5. The system of claim 1 in which said pattern sample and test features include segment based features derived from each segment of each stroke defining sequence of said data points and comprising:

a fourth segment feature provided as a value corresponding with the absolute inflection point x-coordinate;

a fifth segment feature provided as a value corresponding with the absolute inflection point y-coordinate;

a sixth segment feature provided as a value corresponding with the x curvature of a segment of a said stroke; and a seventh segment feature provided as a value corresponding with the y curvature of a segment of a said stroke.

6. The system of claim 1 in which said pattern sample and test features include signature verification features derived from each word defining sequence of said data points and comprising:

a first signature verification feature provided as a value corresponding with the relative interval of time taken to write the word.

7. The system of claim 1 in which said pattern sample and test features include stroke based signature verification features derived from each stroke defining sequence of said data points and comprising:

a second signature verification feature provided as a value corresponding with the relation between the beginning time of a stroke and the interval of time taken to write the word; and a third signature verification feature provided as a value corresponding with the relation between the ending time of a stroke and the interval of time taken to write the word.

8. The system of claim 1 in which said pattern sample and test features include segment based signature verification features derived from each segment of each stroke defining sequence of said data points and comprising:

a fourth signature verification feature provided as a value corresponding with the relation between the interval of time taken to write a segment and the interval of time taken to write a stroke.

9. The system of claim 1 in which said processor is responsive to effect a search of all sample patterns to find those sample patterns whose pattern index features are the same as the index features of said test pattern in order to effect a comparison between the test pattern features and the sample pattern features.

10. The system of claim 1 in which said processor is responsive to effect said comparison by deriving a feature match value corresponding with the deviation of said pattern test features from said pattern sample features and is responsive to derive said output signals when said feature match value is as great as a predetermined recognition cutoff value.

11. The system of claim 10 in which said processor is responsive to generate a new said text-pattern pair corresponding with user entered text and associated said pattern test features and enter said new text pattern pair into said database memory when said feature match value is below said predetermined recognition cutoff value.

12. A system of claim 10 in which said processor is responsive when said feature match value is less than said predetermined recognition cutoff value to enter a search tree based parser mode to extract first pattern stroke and stroke segment features and a corresponding test index therefrom wherein each stroke segment is delimited by either a stroke beginning point ending point or by a stroke inflection point that is close to a baseline, is responsive to carry out a comparison of said first pattern test features with said pattern sample features associated with said identified sample index, responsive in the presence of a correspondence between said first pattern test features and said sample features to derive a first text character sequence result, responsive to selectively combine said stroke and stroke segment features to provide second pattern test features, responsive to carry out a comparison of said second pattern test features with said pattern sample features associated with said identified sample index, and responsive in the presence of a correspondence between said second pattern test features and said sample features to derive output signals corresponding with said text; and display means responsive to said derived output signals for effecting the publication of a said predetermined character sequence of said text associated with said pattern sample features.

13. The method for generating and displaying text corresponding with a stream of coordinate data points generated as the output of a stylus responsive user handwriting input device, comprising the steps of:

storing a compilation of text-pattern pairs in memory, each said pair having been derived as sample features of said handwriting and including an associated sample index derived as aspects of said handwriting sample features, said text of each said pair representing at least one predetermined character glyph;

extracting pattern test features from a stream of said coordinate data points and forming a corresponding test index including the steps of:

determining bounding box parameters for a word defining sequence of said coordinate data points, scanning said word defining coordinate data points and determining word crossings corresponding to each scan line therewith, determining a base line for said word defining sequence of data coordinate points, determining bounding box parameter for each stroke of said word defining sequence of said coordinate data points, determining the aspect ratio of each said stroke wherein such stroke aspect ratio generally is determined to be $K/\pi*ARCTAN$ (stroke-height/stroke-width) where K is a constant, determining the aspect ratio of said word, wherein such word aspect ratio generally is derived as K (height/diagonal) where K is a constant, height is word height and diagonal is the square root of the height squared plus the width squared, determining the relative bottom location of said word, and determining the relative height of said word;

accessing said compilation and identifying a said sample index corresponding with said test index;

accessing said pattern sample features corresponding with said identified sample index and comparing said accessed pattern sample features with said pattern test features;

accessing the said text corresponding with said accessed pattern sample features in the event said comparison derives an acceptable correspondence between said accessed pattern sample features and said pattern test features; and displaying said accessed text.

14. The method of claim 13 including the steps of:

acquiring text associated with said pattern test features when a said sample index is not identified to correspond with said test index; and storing said pattern test features with said acquired text and said test index in said memory as additional said text-pattern pairs.

15. The method of claim 13 including the steps of:

acquiring text associated with said pattern test features when said comparison results in an unacceptable correspondence between said accessed pattern sample features and said pattern test features; and storing said pattern test features with said acquired text and said test index in said memory as additional said text-pattern pairs.

16. The method for generating and displaying text corresponding with a stream of coordinate data points generated as the output of a stylus responsive user handwriting input device, comprising the steps of:

storing a compilation of text-pattern pairs in memory, each said pair having been derived as sample features of said handwriting and including an associated sample index derived as aspects of said handwriting sample features, said text of each said pair representing at least one predetermined character glyph;

extracting pattern test features from a stream of said coordinate data points and a corresponding test index, including the steps of:

carrying out an extrapolation between a sequence of said coordinate data points defining a stroke and deriving a representation of a sequence of data points which are uniformly spaced along the locus thereof defining said strokes, and determining worm moments of said stroke evaluating a select, progressive sequence of a predetermined number of positions of said data points;

accessing said compilation and identifying a said sample index corresponding with said test index;

accessing said pattern sample features corresponding with said identified sample index and comparing said accessed pattern sample features with said pattern test features;

accessing the said text corresponding with said accessed pattern sample features in the event said comparison derives an acceptable correspondence between said accessed pattern sample features and said pattern test features; and displaying said accessed text.

17. The method of claim 16 in which said step for extracting pattern test features includes the steps of:

deriving the average value of said predetermined worm moment of said stroke; and determining the location of stroke bends from said worm moment of said stroke.

18. The method of claim 16 in which said step for extracting pattern test features includes the steps of:

determining the location of inflection points by finding the tops and bottoms of a stroke defining sequence of said representation of coordinate data points;

determining the location of inflection points by deriving the locations of points of crossing of a base line extending through said representation of coordinate data points; and determining the location of inflection points by locating peak values of said worm moments.

19. The method of claim 18 in which said step for extracting pattern test features includes the step of determining the percentage of horizontal, x-coordinate overlap between two contiguous stroke segments as defined by stroke endings and said inflection points.

20. A system for the symbolic-based recognition of a handwriting input to an input surface having an output provided as a stream of coordinate data points, comprising:

a data base memory storing a compilation of text-pattern pairs, said pattern of each said pair having been derived as sample features of said handwriting and including an associated sample index derived as aspects of said handwriting sample features, said text of each said pair representing at least one predetermined character glyph;

a processor, responsive to said output to extract pattern test features and a corresponding test index therefrom, responsive to access said memory stored compilation and identify a said sample index corresponding with said test index, responsive to carry out a comparison of said pattern test features with said pattern sample features associated with said identified sample index, responsive in the presence of a correspondence between said pattern test and sample features to derive output signals corresponding with said text associated with said pattern sample features, said pattern symbols and test features including:

a first word feature provided as a value corresponding with the word bottom location relative to the word base line of a said output representing a word, said relative word bottom being determined to be $K* ((y_{max}+\text{line-space})/(2*\text{line-space}))$ where $y_{max}$ is the visually lowest part of such word measured from the baseline, linespace is a selected spacing between writing lines and K is a constant, a second feature word provided as a value corresponding with the relative height of a said output representing a word, and a third word feature provided as a value corresponding with the aspect ratio of a said output representing a word, said word aspect ratio generally being determined to be K (height/diagonal) where K is a constant, height is word height, and diagonal is the square root of the height squared plus the width squared; and display means responsive to said derived output signals for effecting the publication of a said predetermined character glyph sequence of said text associated with said pattern sample features.

21. The system of claim 20 in which said pattern and test features include stroke based features derived from each stroke defining sequence of said data points and comprising:

a first stroke feature provided as a value corresponding with the average worm moment based moment of a stroke;

a second stroke feature provided as a value corresponding with the aspect ratio of a stroke; and a third stroke feature provided as a value corresponding with the beginning and ending locations of a stroke relative to a dimension of a word within which such stroke is incorporated.

22. The system of claim 20 in which said pattern sample and test features include segment based features derived from each segment of each stroke defining sequence of said data points and comprising:

a first segment feature provided as a value corresponding with the accumulated distances between sequential pairs of said data points defining a stroke from the beginning of a stroke to the end of a segment of a stroke relative to the total distance from the beginning of the stroke to the end of the stroke;

a second segment feature provided as a value corresponding with the x-coordinate overlap between two adjacent segments of a stroke; and a third segment feature provided as a value corresponding with the relative x-coordinate based distance between adjacent inflection points of a stroke.

23. The system of claim 20 in which said pattern sample and test features include segment based features derived from each segment of each stroke defining sequence of said data points and comprising:
- a fourth segment feature provided as a value corresponding with the absolute inflection point x-coordinate relative to the stroke's bounding box;
- a fifth segment feature provided as a value corresponding with the absolute inflection point y-coordinate relative to the stroke's bounding box;
- a sixth segment feature provided as a value corresponding with the x curvature of a segment of a said stroke; and
- a seventh segment feature provided as a value corresponding with the y curvature of a segment of a said stroke.

24. The system of claim 20 in which said pattern sample and test features include signature verification features derived from each word defining sequence of said data points and comprising:
- a first signature verification feature provided as a value corresponding with the relative interval of time taken to write the word.

25. The system of claim 20 in which said pattern sample and test features include stroke based signature verification features derived from each stroke defining sequence of said data points and comprising:
- a second signature verification feature provided as a value corresponding with the relation between the beginning time of a stroke and the interval of time taken to write the word; and
- a third signature verification feature provided as a value corresponding with the relation between the ending time of a stroke and the interval of time taken to write the word.

26. The system of claim 20 in which said pattern sample and test features include segment based signature verification features derived from each segment of each stroke defining sequence of said data points and comprising:
- a fourth signature verification feature provided as a value corresponding with the relation between the interval of time taken to write a segment and the interval of time taken to write a stroke.

27. A system for the symbolic-based recognition of a handwriting input to an input surface having an output provided as a stream of coordinate data points, comprising:
- a data base memory storing a compilation of text-pattern pairs, said pattern of each said pair having been derived as sample features of said handwriting and including an associated sample index derived as aspects of said handwriting sample features, said text of each said pair representing at least one predetermined character glyph;
- a processor, responsive to said output to extract pattern test features and a corresponding test index therefrom, responsive to access said memory stored compilation and identify a said sample index corresponding with said test index, responsive to carry out a comparison of said pattern test features with said pattern sample features associated with said identified sample index, responsive in the presence of a correspondence between said pattern test and sample features to derive output signals corresponding with said text associated with said pattern sample features,
  wherein said pattern sample and test features include stroke based features derived from each stroke defining sequence of said data points and comprising:
  - a first stroke feature provided as a value corresponding with the average worm moment based moment of stroke,
  - a second stroke feature provided as a value corresponding with the aspect ratio of a stroke, said stroke aspect ratio generally being determined to be $K/\pi *$ ARCTAN (stroke-height/stroke-width) where K is a constant, and
  - a third stroke feature provided as a value corresponding with the beginning and ending locations of a stroke relative to a dimension of a word within which such stroke is incorporated, said third stroke feature for the general case being expressed as:

$x_0 = K (x_b - x_{min})/(x_{max} - x_{min})$ and
  $x_1 = K (x_e - x_{min})/(x_{max} x_{min})$,
  $y_0 = K (y_b - y_{min})/(y_{max} y_{min})$ and
  $y_1 = K (y_e - y_{min})/(x = y_{max} y_{min})$, where $x_0$, $y_0$ are the stroke's respective beginning x- and y- coordinate features, $x_1$, $y_1$ are the strokes respective ending x- and y- coordinate features $x_b$, $y_b$ are the stroke's beginning respective x- and y- coordinate values, $x_{min}$, $y_{min}$ are the word's minimum respective x- and y- coordinates, $x_{max}$, $y_{max}$ are the word's maximum respective x- and y- coordinates, and $x_e$, $y_e$ are the stroke's respective x- and y- ending coordinate values; and
- display means responsive to said derived output signals for effecting the publication of a said predetermined character glyph sequence of said text associated with said pattern sample features.

28. The system of claim 27 in which said pattern sample and test features include segment based features derived from each segment of each stroke defining sequence of said data points and comprising:
- a first segment feature provided as a value corresponding with the accumulated distances between sequential pairs of said data points defining a stroke from the beginning of a stroke to the end of a segment of a stroke relative to the total distance from the beginning of the stroke to the end of the stroke;
- a second segment feature provided as a value corresponding with the x-coordinate overlap between two adjacent segments of a stroke; and
- a third segment feature provided as a value corresponding with the relative x-coordinate based distance between adjacent inflection points of a stroke.

29. The system of claim 27 in which said pattern sample and test features include segment based features derived from each segment of each stroke defining sequence of said data points and comprising:
- a fourth segment feature provided as a value corresponding with the absolute inflection point x-coordinate relative to the stroke's bounding box;
- a fifth segment feature provided as a value corresponding with the absolute inflection point y-coordinate relative to the stroke's bounding box;
- a sixth segment feature provided as a value corresponding with the x curvature of a segment of a said stroke; and
- a seventh segment feature provided as a value corresponding with the y curvature of a segment of a said stroke.

30. The system of claim 27 in which said pattern sample and test features include signature verification features derived from each word defining sequence of said data points and comprising:

a first signature verification feature provided as a value corresponding with the relative interval of time taken to write the word.

31. The system of claim 27 in which said pattern sample and test features include stroke based signature verification features derived from each stroke defining sequence of said data points and comprising:

a second signature verification feature provided as a value corresponding with the relation between the beginning time of a stroke and the interval of time taken to write the word; and a third signature verification feature provided as a value corresponding with the relation between the ending time of a stroke and interval of time taken to write the word.

32. The system of claim 27 in which said pattern sample and test features include segment based signature verification features derived from each segment of each stroke defining sequence of said data points and comprising:

a fourth signature verification feature provided as a value corresponding with the relation between the interval of time taken to write a segment and the interval of time taken to write a stroke.

33. A system for the symbolic-based recognition of a handwriting input to an input surface having an output provided as a stream of coordinate data points, comprising:

a data base memory storing a compilation of text-pattern pairs, said pattern of each pair having been derived as sample features of said handwriting and including an associated sample index derived as aspects of said handwriting sample features, said text of each said pair representing at least one predetermined character glyph;

a processor, responsive to said output to extract pattern test features and a corresponding test index therefrom, responsive to access said memory stored compilation and identify a said sample index corresponding with said test index, responsive to carry out a comparison of said pattern test features with said pattern sample features associated with said identified sample index, responsive in the presence of a correspondence between said pattern test and sample features to derive output signals corresponding with said text associated with said pattern sample features;

said pattern sample and test features including segment based features derived from each segment of each stroke defining sequence of said data points and comprising:

a first segment feature provided as a value corresponding with the accumulated distances between sequential pairs of said data points defining a stroke from the beginning of a stroke to the end of a segment of a stroke relative to the total distance from the beginning of the stroke to the end of the stroke, a second segment feature provided as a value corresponding with the x-coordinate overlap between two adjacent segments of a stroke, and a third segment feature provided as a value corresponding with the relative x-coordinate based distance between adjacent inflection points of a stroke, wherein such inflection points comprise a significant bend in a stroke, a top location, a bottom location, and a baseline crossing point in the stroke; and display means responsive to said derived output signals for effecting the publication of a said predetermined character glyph sequence of said text associated with said pattern sample features.

34. The system of claim 33 in which said pattern sample and test features include segment based features derived from each segment of each stroke defining sequence of said data points and comprising:

a fourth segment feature provided as a value corresponding with the absolute inflection point x-coordinate relative to the stroke's bounding box;

a fifth segment feature provided as a value corresponding with the absolute inflection point y-coordinate relative to the stroke's bounding box;

a sixth segment feature provided as a value corresponding with the x curvature of a segment of a stroke; and a seventh segment feature provided as a value corresponding with the y curvature of a segment of a said stroke.

35. The system of claim 33 in which said pattern sample and test features include signature verification features derived from each word defining sequence of said data points and comprising:

a first signature verification feature provided as a value corresponding with the relative interval of time taken to write the word.

36. The system of claim 33 in which said pattern sample and test features include stroke based signature verification features derived from each stroke defining sequence of said data points and comprising:

a second signature verification feature provided as a value corresponding with the relation between the beginning time of a stroke and the interval of time taken to write the word; and a third signature verification feature provided as a value corresponding with the relation between the ending time of a stroke and the interval of time taken to write the word.

37. The system of claim 33 in which said pattern sample and test features include segment based signature verification features derived from each segment of each stroke defining sequence of said data points and comprising:

a fourth signature verification feature provided as a value corresponding with the relation between the interval of time taken to write a segment and the interval of time taken to write a stroke.

38. A system for the symbolic-based recognition of a handwriting input to an input surface having an output provided as a stream of coordinate data points, comprising:

a data base memory storing a compilation of text-pattern pairs, said pattern of each said pair having been derived as sample features of said handwriting and including an associated sample index derived as aspects of said handwriting sample features, said text of each said pair representing at least one predetermined character glyph;

a processor responsive to said output to extract pattern test features and a corresponding test index therefrom, responsive to access said memory stored compilation and identify a said sample index corresponding with said test index, responsive to carry out a comparison of said pattern test features with said pattern sample features associated with said identified sample index, responsive in the presence of a correspondence between said pattern test and sample features to derive output signals corresponding with said text associated with said pattern sample features;

said pattern sample and test features including segment based features derived from each segment of each stroke defining sequence of said data points and comprising:

a first segment feature provided as a value corresponding with the absolute inflection point x-coordinate, said absolute inflection point x-coordinate being a function of the difference of the x-coordinate distance of the inflection point from the minimum x-coordinate value of a stroke to the x-coordinate span of such stroke, a second segment feature provided as a value corresponding with the absolute inflection point y-coordinate, said absolute inflection point y-coordinate being a function of the difference of the y-coordinate distance of the inflection point from the minimum y-coordinate value of a stroke to the y-coordinate span of such stroke, a third segment feature provided as a value corresponding with the x curvature of a segment of a said stroke relative to the stroke's bounding box, and a fourth segment feature provided as a value corresponding with the y curvature of a segment of a said stroke relative to the stroke's bounding box; and display means responsive to said derived output signals for effecting the publication of a said predetermined character glyph of said text associated with said pattern sample features.

39. The system of claim 38 in which said pattern sample and test features include signature verification features derived from each word defining sequence of said data points and comprising:

a first signature verification feature provided as a value corresponding with the relative interval of time taken to write the word.

40. The system of claim 38 in which said pattern sample and test features include stroke based signature verification features derived from each stroke defining sequence of said data points and comprising:

a second signature verification feature provided as a value corresponding with the relation between the beginning time of a stroke and the interval of time taken to write the word; and a third signature verification feature provided as a value corresponding with the relation between the ending time of a stroke an the interval of time taken to write the word.

41. The system of claim 38 in which said pattern sample and test features include segment based signature verification features derived from each segment of each stroke defining sequence of said data points and comprising:

a fourth signature verification feature provided as a value corresponding with the relation between the interval of time taken to write a segment and the interval of time taken to write a stroke.

* * * * *